(12) United States Patent  
Sueyoshi et al.

(10) Patent No.: US 6,460,016 B1
(45) Date of Patent: Oct. 1, 2002

(54) AUDIO DECODING DEVICE FOR DECODING CODED AUDIO INFORMATION WITH MULTIPLE CHANNELS

(75) Inventors: Masahiro Sueyoshi, Neyagawa (JP); Shuji Miyasaka, Neyagawa (JP); Tukuru Ishito, Kyoto (JP); Takeshi Fujita, Takatsuki (JP); Takashi Katayama, Katano (JP); Masaharu Matsumoto, Katano (JP); Tuyoshi Nakamura, Kasuya-gun (JP); Eiji Otomura, Ibaragi (JP); Akihisa Kawamura, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/685,234

(22) Filed: Oct. 10, 2000

Related U.S. Application Data

(63) Continuation of application No. 08/986,734, filed on Dec. 8, 1997, now Pat. No. 6,233,562.

(30) Foreign Application Priority Data

Dec. 9, 1996 (JP) .............................................. 8-328323
May 22, 1997 (JP) .............................................. 9-131984
May 15, 1997 (JP) .............................................. 9-125426

(51) Int. Cl.[7] .......................... G10L 21/04; G10L 19/00
(52) U.S. Cl. ..................... 704/200.1; 704/500; 704/503
(58) Field of Search .............................. 704/200.1, 500, 704/503

(56) References Cited

U.S. PATENT DOCUMENTS

| 5,029,200 A | | 7/1991 | Haas et al. | |
| 5,384,890 A | | 1/1995 | Anderson et al. | |
| 5,644,310 A | * | 7/1997 | Laczko, Sr. et al. | 341/143 |
| 5,729,556 A | * | 3/1998 | Benbassat et al. | 714/747 |
| 5,774,864 A | | 6/1998 | Han et al. | |
| 5,931,934 A | | 8/1999 | Li et al. | |

FOREIGN PATENT DOCUMENTS

| JP | 4344699 | 12/1992 |
| JP | 5-11800 | 1/1993 |

OTHER PUBLICATIONS

Young Tae Han, et al. "Design and Implementation of the MPEG–2 Multi–Channel Audio Decoder," IEICE Trans. Information & Systems, vol. E79–D, No. 6, P. 759–763.

Sung–Chul Han, et al. "An ASIC Implementation of the MPEG–2 Audio Decoder," IEEE Trans. Consumer Electronics, vol. 42, No. 3, p. 540–645.

P.A. Sarginson, "MPEG–2: A tutorial introduction to the systems layer," IEE Colloquium on MPEG–2, vol. 4, P. 1–13.

Greg Reid, "An MPEG–2 digital decoder design: A practical approach with emphasis on elementary stream data flows," Pro. 1997 South African Symposium on Communications and Signal Processing (COMSIG '97) P. 37–24.

* cited by examiner

Primary Examiner—Tālivaldis Ivars Šmits
(74) Attorney, Agent, or Firm—Renner, Otto, Boisselle & Sklar

(57) ABSTRACT

An audio decoding device for decoding audio information with multiple channels includes a coded information memory section for storing the coded audio information; an information transmission section for reading the coded audio information stored at an arbitrary position in the coded information memory section; and an audio decoding section for decoding the coded audio information read by the information transmission section and outputting the resultant audio information in accordance with a time axis, wherein the information transmission section includes a buffer memory for retaining an address of an actual pointer for reading the coded audio information in the coded information memory section so as not to be reread, an address of a temporary pointer for reading the coded audio information in the coded information memory section so as to be reread, actual pointer data read by the actual pointer, and temporary pointer data read by the temporary pointer.

7 Claims, 17 Drawing Sheets

FIG. 7

| Virtual address (hexadecimal) | Actual address (hexadecimal) |
|---|---|
| 0x000 ~ 0x0ff | 0x000 ~ 0x0ff |
| 0x100 ~ 0x1ff | 0x100 ~ 0x1ff |
| 0x200 ~ 0x2ff | 0x200 ~ 0x2ff |
| 0x300 ~ 0x3ff | 0x300 ~ 0x3ff |
| 0x400 ~ 0x4ff | 0x400 ~ 0x4ff |
| 0x500 ~ 0x5ff | 0x500 ~ 0x5ff |
| 0x600 ~ 0x6ff | 0x600 ~ 0x6ff |
| 0x700 ~ 0x7ff | 0x700 ~ 0x7ff |
| 0x800 ~ 0x8ff | 0x800 ~ 0x8ff |
| 0x900 ~ 0x9ff | 0x900 ~ 0x9ff |
| 0xa00 ~ 0xaff | 0xa00 ~ 0xaff |
| 0xb00 ~ 0xbff | 0xb00 ~ 0xbff |
| 0xc00 ~ 0xcff | 0x400 ~ 0x4ff |
| 0xd00 ~ 0xdff | 0x500 ~ 0x5ff |
| 0xe00 ~ 0xeff | 0x600 ~ 0x6ff |
| 0xf00 ~ 0xfff | 0x700 ~ 0x7ff |

AUDIO DECODING DEVICE FOR DECODING CODED AUDIO INFORMATION WITH MULTIPLE CHANNELS

This is a continuation of application Ser. No. 08/986,734, filed Dec. 8, 1997 now U.S. Pat. No. 6,233,562.

BACKGROUND OF THE INVENTION

1. Field of the Invention

The present invention relates to an audio decoding device for forming an audio signal by decoding coded signals transmitted by multi-channels of, for example, MPEG2, and also to a signal processing device for performing decoding by synchronizing audio compression signals such as MPEG audio signals or Dolby® AC-3 signals between an internal decoder and an external decoder.

2. Description of the Related Art

In MPEG2, for example, audio signals to be output simultaneously are transmitted through multi-channels.

In a bit stream by which the multi-channel signals are transmitted, channels for audio signals to be reproduced simultaneously are not proximate to each other and are arranged discretely timewise.

In order to decode and output the coded signals for the multi-channels in such a bit stream, signal decoding should be performed frame by frame as seen in an MPEG2 multi-channel decoder program provided by, for example, the FTP site of the University of California at Berkeley.

Alternatively, the coded signals on the channels arranged in the first half of the frame are temporarily stored in a memory, and then these coded signals are decoded while the coded signals on the channels arranged in the second half of the frame are decoded.

In either case, a large amount of coded signals need to be temporarily stored in a memory, which raises the required capacity of the memory and thus increases the size of the device.

Moreover, in order to perform the operation for decoding the coded signals, a memory capable of high-speed access should be used for temporarily storing the coded signals used for the operation. Since such a memory is expensive, reduction in the required capacity of the memory has been strongly demanded.

Regarding the necessity of a memory capable of high-speed access, a conventional decoding device 500 will be described with reference to FIG. 17.

The decoding device 500 includes a memory section 510 and an operation section 520. The operation section 520 includes a sub-band signal generation section 521 and a sub-band synthesis section 522. When coded signals for n channels are given, the operation section 520 decodes the coded signals into sub-band signals. The sub-band signals for each channel is processed with a sub-band synthesis filter operation to generate an audio signal to be output. The memory section 510 includes a high-speed access memory such as an SRAM, which includes memory areas 511 through 514 for storing sub-band synthesis filter data and a memory area 515 for storing the sub-band signal data.

The decoding device 500 having the above-described structure operates in the following manner.

When the coded signals are input to the operation section 520, the sub-band signal generation device 521 decodes the coded signals into sub-band signals and temporarily stores the sub-band signals in the memory area 515. Then, the sub-band synthesis section 522 reads the sub-band signals from the memory area 515 and performs a sub-band synthesis filter operation of the sub-band signals. Thus, an audio signal is generated and output.

The sub-band synthesis filter data in the memory areas 511 through 514 is partially updated by the sub-band synthesis filter data generated from the sub-band signals in the memory area 515. Accordingly, the operation section 520 needs to read the sub-band synthesis filter data from the memory section 510 when performing the sub-band synthesis filter operation and write again the sub-band synthesis filter data to the memory section 510 after the operation.

The memory section 510 needs to be a memory capable of high-speed access. In the case where the decoding device 500 corresponds to multi-channels, e.g., four channels, the memory section 510 needs to have four memory areas 511 through 514 so as to store sub-band synthesis filter data for the four channels.

A high-speed access memory such as an SRAM used for the memory section 510 needs to have a sufficiently large memory capacity to retain the sub-band synthesis filter data for at least four channels in order to perform real-time reproduction of four-channel data. Such a memory, which is generally expensive, significantly increases the cost of the audio decoding devices.

One format for digital audio interface is the IEC958 format. The IEC958 format is common for industrial and consumer uses. The sub-frame format thereof includes an area in which a synchronous preamble, AUX, 20-bit-unit audio data and other data can be added.

In the case of 2-channel transmission, a frame is formed by alternately repeating sub-frames for each of the two channels, and a block is formed of first through 192nd frames and then transmitted. The format of the audio data to be inserted into the sub-frames is not standardized. For example, a PCM signal formed by sampling an analog audio signal or a non-PCM signal (defined by the format described in ISO/IEC EC 11172-3:1993 and 13818-3:1996) such as compression audio data formed by sub-band coding.

In the case of reproducing coded signals for multi-channels (e.g., five channels of right forward, left forward, center, right rearward and left rearward) by an audio reproduction apparatus including a decoder, the coded signals for all the channels cannot always be decoded only by a built-in decoder (referred to as the "internal decoder"). Many general audio reproduction apparatuses output only audio signals in the right forward and left forward channels from the internal decoder. Such audio reproduction apparatuses require a separate decoder or a separate audio reproduction apparatus (referred to as the "external decoder") in order to decode the coded signals for the other channels.

In order to synchronize an audio signal output from the internal decoder and an audio signal output from the external decoder while transmitting a non-PCM signal of the IEC958 format from the internal decoder to the external decoder, a conventional audio reproduction apparatus requires a buffer memory for performing synchronization between the internal decoder and the external decoder. Such a buffer memory needs to have a sufficiently large capacity to retain the coded signals corresponding to a transmission delay time.

As can be appreciated from the above description, synchronization between the internal decoder and the external decoder requires a buffer memory therebetween, which inconveniently increases the size of the apparatus.

SUMMARY OF THE INVENTION

According to one aspect of the invention, an audio decoding device includes a coded information memory section for storing coded audio information; an information transmission section for reading the coded audio information stored at an arbitrary position in the coded information memory section; and an audio decoding section for decoding the coded audio information read by the information transmission section and outputting the resultant audio information in accordance with a time axis.

In one embodiment of the invention, the information transmission section includes a buffer memory for retaining an address of an actual pointer for reading the coded audio information in the coded information memory section so as not to be reread, an address of a temporary pointer for reading the coded audio information in the coded information memory section so as to be reread, actual pointer data read by the actual pointer, and temporary pointer data read by the temporary pointer.

In one embodiment of the invention, the actual pointer allows the coded audio information input before the coded audio information pointed by the actual pointer to be erased from the coded information memory section.

In one embodiment of the invention, the actual pointer points a reading position of the coded audio information input after the coded audio information pointed by the actual pointer, to the coded information memory section.

In one embodiment of the invention, in the case where the coded audio information is to be decoded in the order of being input to the coded information memory section, the information transmission section transmits the coded audio information to the audio decoding section by one of the actual pointer and the temporary pointer in the order of being input to the coded information memory section. In the case where the coded audio information is to be decoded in a different order from that of being input to the coded information memory section, the information transmission section transmits the coded audio information to the audio decoding section in accordance with a decoding order by the actual pointer and the temporary pointer.

In one embodiment of the invention, in the case where coded audio information for a plurality of channels to be output simultaneously are stored proximately to each other in the coded information memory section, the information transmission section transmits the coded audio information for the plurality of channels to the audio decoding section by one of the actual pointer and the temporary pointer. In the case where coded audio information for the plurality of channels to be output simultaneously are stored discretely in the coded information memory section, the information transmission section transmits the coded audio information for the plurality of channels to the audio decoding section by the actual pointer and the temporary pointer.

According to another aspect of the invention, an audio decoding device includes a coded information memory section for accumulating coded audio information for a plurality of channels; an information transmission section for reading the audio coded information stored at an arbitrary position in the coded information memory section; and an audio decoding section for decoding the coded audio information read by the information transmission section and outputting the resultant audio information in accordance with a time axis. Where an actual pointer reads the coded audio information in the coded information memory section so as not to be reread and a temporary pointer reads the coded audio information in the coded information memory section so as to be reread, in the case where the coded audio information for the plurality of channels to be output simultaneously are stored in the coded information memory section at such positions to be continuously transmitted to the audio decoding section, the information transmission section continuously transmits the coded audio information for the plurality of channels to the audio decoding section using one of the actual pointer and the temporary pointer. In the case where the coded audio information for the plurality of channels to be output simultaneously are stored in the coded information memory section at such positions not to be continuously transmitted to the audio decoding section, the information transmission section continuously transmits the coded audio information for the plurality of channels to the audio decoding section using the actual pointer and the temporary pointer. The audio decoding section decodes the coded audio information for the plurality of channels into audio information and outputs the resultant audio information for the plurality of channels simultaneously.

According to still another aspect of the invention, an audio decoding device includes a coded information memory section for accumulating coded audio information for n channels, where $n \geq 2$; an information transmission section for reading the audio coded information stored for each of the channels at an arbitrary position in the coded information memory section; and an audio decoding section for decoding the coded audio information read by the information transmission section and outputting the resultant audio information in accordance with a time axis. The coded information memory section frames the audio information for n channels by a prescribed time unit, performs frame-by-frame compression coding of the audio information into the coded audio information, stores the coded audio information for m channels in a first half of each of the frames in accordance with the time axis, where $n>m \geq 1$, and stores the coded audio information for (n−m) channels in a second half of each of the frames in accordance with the time axis. Where an actual pointer reads the coded audio information in the coded information memory section so as not to be reread and a temporary pointer reads the coded audio information in the coded information memory section so as to be reread, the actual pointer in the transmission section transmits the coded audio information for m channels from the first half of each of the frames to the audio decoding section by a unit of a prescribed time period, and the temporary pointer in the transmission section transmits the coded audio information for (n−m) channels from the second half of each of the frames to the audio decoding section by a unit of prescribed time period.

According to still another aspect of the invention, an audio decoding device decodes audio signals for n channels, where $n<1$, by sub-band synthesis operation using sub-band synthesis filter data and sub-band signal data. The audio decoding device includes a first memory section for retaining the sub-band synthesis filter data and the sub-band signal data for m channels used for the sub-band synthesis operation, where $m<n$; a second memory section for retaining the sub-band signal data and the sub-band synthesis data for n channels; an operation section for receiving the coded audio data and decoding the coded audio data into sub-band data, performing the sub-band synthesis filter operation using the data retained in the first memory section and outputting the decoded audio data for m channels, and requesting replacement of new sub-band synthesis filter data calculated by the sub-band synthesis filter operation and sub-band synthesis filter data subsequently required; and a data transfer section for, upon request from the operation section, replacing the sub-band synthesis filter data and the sub-band signal data in the first and second memory sections by a unit of m channels.

In one embodiment of the invention, the operation section includes a continuous transfer instruction section for instructing data transfer between the first memory section and the second memory section to be performed a plurality of times by instructing the data transfer once.

In one embodiment of the invention, the operation section includes a virtual address assignment section for assuming a virtual address to exist following an actual address at a termination point of a memory area, in the first memory section, storing the sub-band synthesis filter data, causing a start point of the virtual address to correspond to a prescribed actual address of the memory area, and also causing the following virtual addresses to correspond to actual addresses in the memory area sequentially.

In one embodiment of the invention, the first memory section includes a first memory area for retaining sub-band synthesis filter data and sub-band signal data for one channel, and a second memory area for retaining sub-band synthesis filter data and sub-band signal data for another channel. When the operation section performs the sub-band synthesis filter operation for i channels, where i is in the range of 1 through n, using the data stored in the first memory area in the first memory section, the operation section transfers the data for j channels retained in the second memory section to the second memory area of the first memory section, where j is in the range of 1 through n but different from i, and when the operation section performs the sub-band synthesis filter operation for j channels using the data in the second memory area in the first memory section, the operation section transfers the data for k channels retained in the second memory section to the first memory area of the first memory section, where k is in the range of 1 through n but different from i and j. Thus, the data transfer and the sub-band synthesis filter operation are performed in parallel.

According to still another aspect of the invention, an audio decodes device for decoding audio signals for n channels, where n>1, by sub-band synthesis operation using sub-band synthesis filter data and sub-band signal data. The audio decoding device includes a first memory section for retaining the sub-band synthesis filter data and the sub-band signal data for at least one channel used for the sub-band synthesis operation; a second memory section for retaining the sub-band signal data and the sub-band synthesis data for n channels; an operation section for receiving the coded audio data and decoding the coded audio data into sub-band data, performing the sub-band synthesis filter operation using the data retained in the first memory section and outputting the decoded audio data for one channel, and requesting replacement of new sub-band synthesis filter data calculated by the sub-band synthesis filter operation and sub-band synthesis filter data subsequently required; and a data transfer section for, upon request from the operation section, replacing the sub-band synthesis filter data and the sub-band signal data in the first and second memory sections channel by channel.

In one embodiment of the invention, the operation section includes a continuous transfer instruction section for instructing data transfer between the first memory section and the second memory section to be performed a plurality of times by instructing the data transfer once.

In one embodiment of the invention, the operation section includes a virtual address assignment section for assuming a virtual address following an actual address at a termination point of a memory area, in the first memory section, storing the sub-band synthesis filter data, causing a start point of the virtual address to correspond to a prescribed actual address the memory area, and also causing the following virtual addresses to correspond to actual addresses in the memory area sequentially.

According to still another aspect of the invention, a signal processing device includes a first processing section for extracting frame data of at least one frame from continuous frame data for a plurality of channels, processing the data for a specific channel included in the extracted frame data, and outputting the processed data as first output information; and a second processing section for extracting data for another channel included in any of at least one frames fi+j following a frame fi processed by the first processing section, where j≧1, converting the extracted data into a stream data, and outputting the converted data as second output information.

In one embodiment of the invention, the second processing section includes a frame establishment section for, in the case where the frame data includes a synchronous word indicating the start of the frame data and side information indicating the length of the frame data, confirming that the synchronous word appears in each of a plurality of frames, and a frame processing section for processing the frame data in accordance with a prescribed format, converting the processed data into stream data of a common format which is acceptable to another signal processing apparatus, and outputting the converted stream data.

In one embodiment of the invention, the frame establishment section detects the synchronous word and calculates the length of the frame data using the side information, and then detects the synchronous word at the start of the following frame, thereby confirming the establishment of data of one frame.

In one embodiment of the invention, the frame establishment section detects a data error of the frame.

In one embodiment of the invention, in the case where the frame establishment is confirmed by the frame establishment section, the frame processing section adds information, indicating that the frame has been established, to the stream data to be output. In the case where the frame has not been established, the frame processing section adds the information, indicating that the frame has not been established, to the stream data to be output.

In one embodiment of the invention, the frame data is multi-channel audio compression data, and the frame processing section converts the input frame data to a non-PCM signal defined by the IEC958 format and outputs the non-PCM signal.

In one embodiment of the invention, the frame data is multi-channel audio compression data, and the second processing section detects the synchronous word of the input frame data and calculates the length of the frame to confirm the synchronous word of the following frame data, further detects a data error of the frame to establish the frame, and generates a non-PCM signal defined by the IEC958 format and outputs the non-PCM signal.

In one embodiment of the invention, the first processing section decodes the frame data before framing.

In one embodiment of the invention, the first processing section decodes the frame data with a delay of a prescribed time period with respect to the time when the frame is established by the second processing section.

In one embodiment of the invention, the first processing section decodes the frame data of the frame, the establishment of which is confirmed by the second processing section, with a delay of a prescribed time period with respect to the time when the establishment is confirmed by the second processing section.

In one embodiment of the invention, the frame data is multi-channel audio compression data, and the first processing section decodes the data of the frame, the establishment of which is confirmed by the second processing section, with a delay of a prescribed time period with respect to the time when the frame is established.

In one embodiment of the invention, the frame data is multi-channel audio compression data, and the first processing section decodes the audio compression data into an audio signal with a delay of a prescribed time period with respect to the time when the audio compression data is output as a non-PCM signal defined by the IEC958 format by the second processing section.

In one embodiment of the invention, the frame data is multi-channel audio compression data, and the first processing section, when the decoding of the audio data is started, continuously processes the frame data for a prescribed frame number and outputs the first output information, and then generates the first output information alternately with the conversion performed by the second processing section.

In one embodiment of the invention, the frame data is multi-channel audio compression data, and the first processing section includes a delay amount determination section, for, when the frame data is converted into a non-PCM signal defined by the. IEC958 format, calculating time delay caused by the signal conversion and determining the timing for starting the decoding of the audio data based on the delay amount.

Thus, the invention described herein makes possible the advantages of (1) providing an audio decoding device for reproducing audio signals for a plurality of channels simultaneously, while minimizing the required capacity of the memory for temporarily storing coded signals for the channels, even where the channels for the audio signals to be reproduced simultaneously are arranged discretely timewise as in an MPEG2 multi-channel bit stream, and thus can be formed as a one-chip device relatively easily; (2) providing an audio decoding device for minimizing the rise in the costs of the memory used for decoding the coded signals and also having an improved processing ability of audio signals of a sub-band coding system by using both a memory capable of high-speed access and a memory not capable of high-speed access (e.g., DRAM) in a memory section; and (3) providing a signal processing device for, when the multi-channel coded signals are transmitted from the internal decoder to the external decoder, reducing the required capacity of the buffer memory provided therebetween while synchronizing the audio signal output from the internal decoder and the audio signal output from the external decoder.

These and other advantages of the present invention will become apparent to those skilled in the art upon reading and understanding the following detailed description with reference to the accompanying figures.

BRIEF DESCRIPTION OF THE DRAWINGS

FIG. 7 is a view showing the correspondence between virtual addresses and actual addresses in the audio decoding device shown in FIG. 3;

DESCRIPTION OF THE PREFERRED EMBODIMENTS

Example 1

Figure 1:
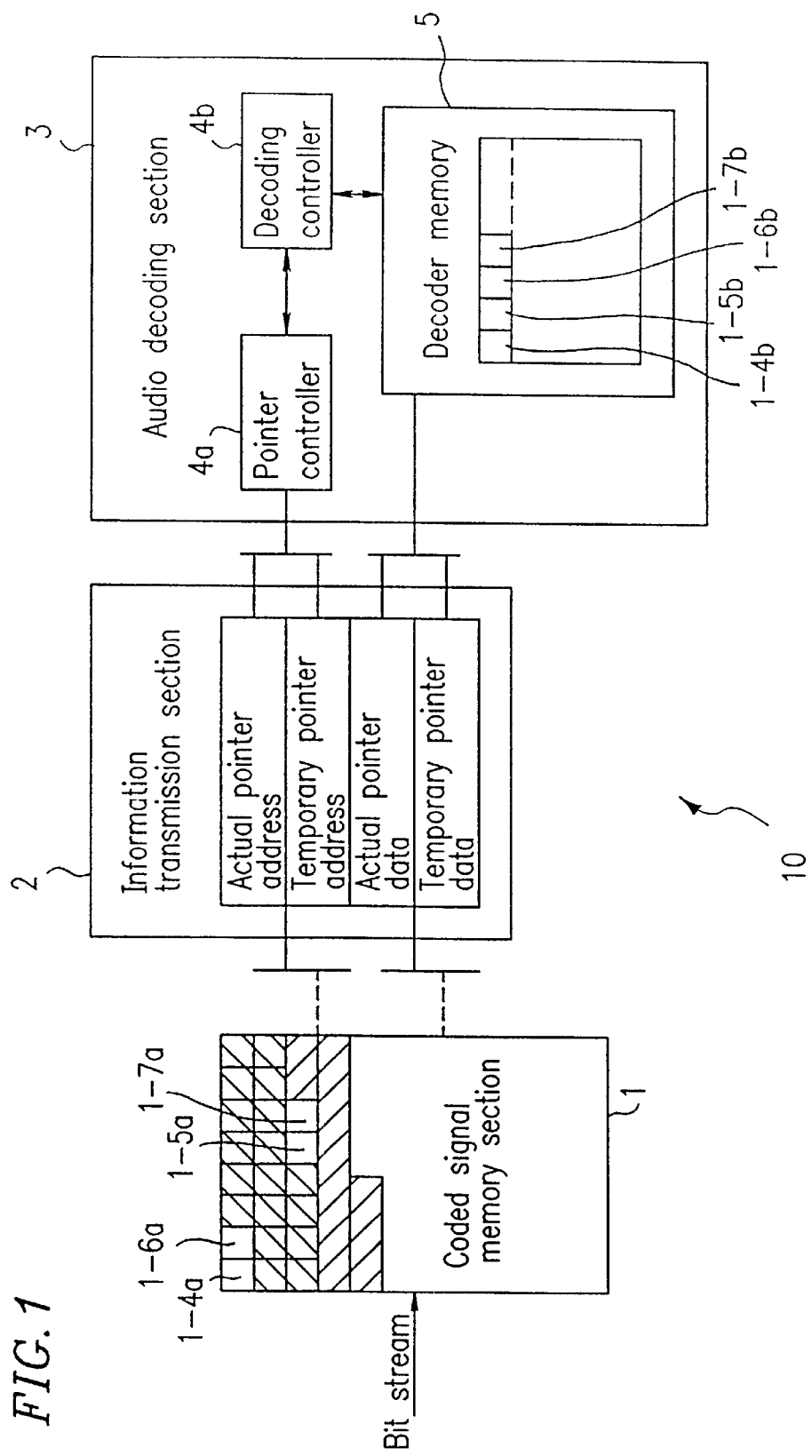
FIG. 1 is a block diagram of an audio decoding device in a first example according to the present invention.

FIG. 1 is a view showing a structure of an audio decoding device 10 in a first example according to the present invention. As shown in FIG. 1, the audio decoding device 10 includes a coded signal memory section 1, an information transmission section 2 and an audio decoding section 3.

The coded signal memory section 1 includes a memory such as a RAM, and temporarily stores multi-channel coded signals coded by, for example, MPEG1 or MPEG2 in the form of a bit stream which is defined by MPEG1 or MPEG2.

The coded signal memory section 1 is not required to have a high-speed access capability and thus can include an inexpensive memory such as a DRAM.

The information transmission section 2 reads the coded signals stored in the coded signal memory section 1 regardless of the order in which the signals are stored, and sends the signals to the audio decoding section 3. The information transmission section 2 has the function of an address counter including one actual pointer and one or more temporary pointers, and includes a buffer memory for retaining an actual pointer address, a temporary pointer address, actual pointer data and temporary pointer data.

As shown in FIG. 1, the coded signal memory section 1 includes a plurality of memory areas. Information in a memory area pointed by the actual pointer is read and replaced with new information, and the old information is deleted. The temporary pointer can retrieve arbitrary information in the coded signal memory section 1 and allows the retrieved information to remain in the coded signal memory section 1 after the information is read.

The audio decoding section 3 includes a pointer controller 4a, a decoding controller 4b and a decoder memory 5. The pointer controller 4a indicates the addresses of the actual pointer and the temporary pointer to the information transmission section 2. By such pointer address control, the coded signals can be input from the coded signal memory section 1, to the information transmission section 2 and to the audio decoding section 3 along a time axis. Thus, the coded signals can be decoded and synthesized into an audio signal to be output.

The decoder memory 5 is used for an operation performed by the decoding controller 4b and is required to have a high-speed access capability. Accordingly, the decoder memory 5 is a memory capable of high-speed access, the capacity of which is to be reduced according to the present invention.

Figure 2:
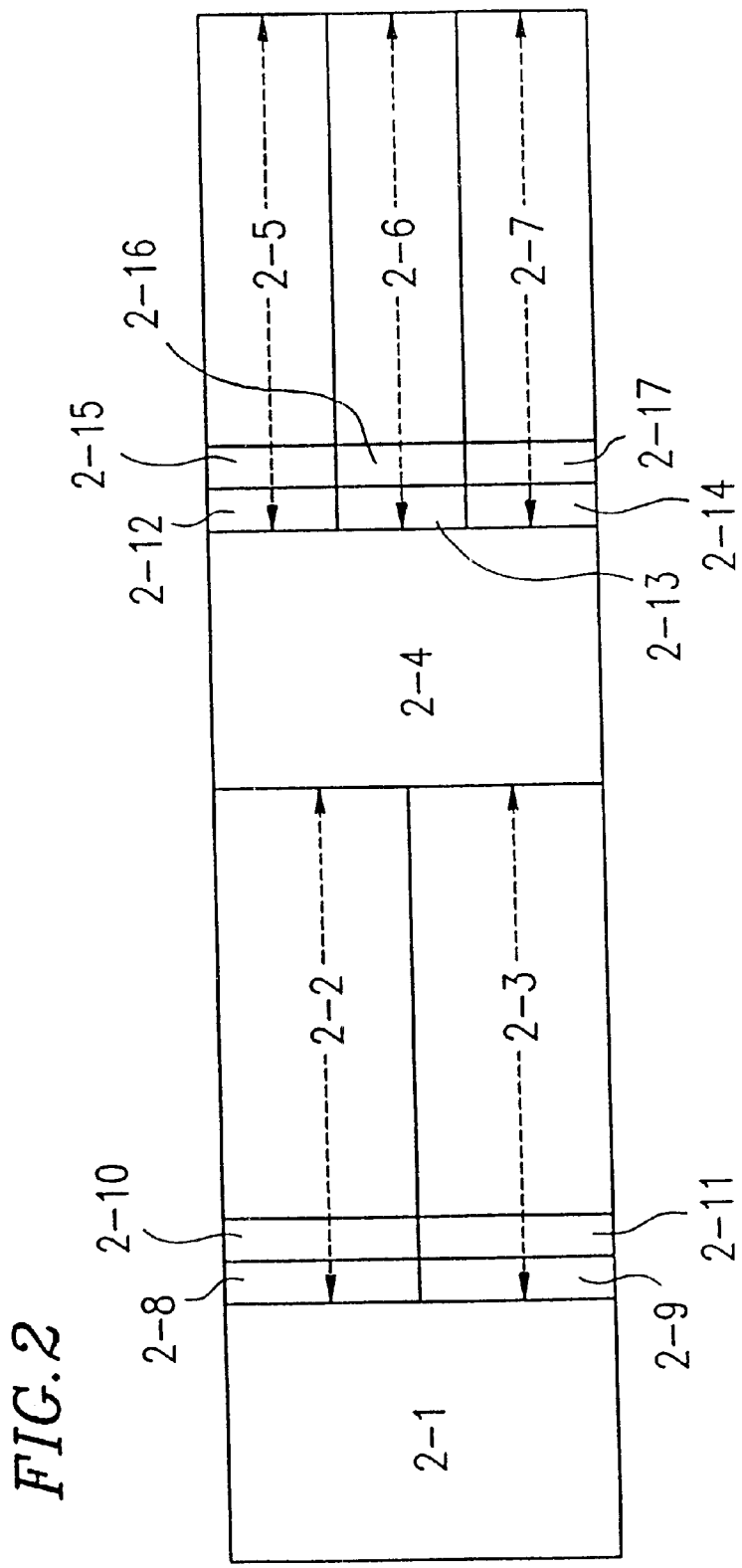
FIG. 2 is a view showing signal arrangement in an MPEG2 bit stream.

FIG. 2 shows a bit stream by which multi-channel coded signals coded by MPEG1 MEPG2 are transmitted. The bit stream is input to the coded signal memory section 1.

In MPEG2 as well as in MPEG1, a bit stream is formed of a plurality of audio decoding units referred to as AAU (Audio Access Unit). Each AAU includes a frame having a prescribed number of bits. At the start of the AAU, a header is provided. In MPEG1, the header is followed by an error check bit area, 2-channel audio data area and an ancillary data area.

In MPEG2, a bit stream includes coded signals for, for example, five channels. The coded signals for three channels including sound are inserted into the area which is used as the ancillary data area in the case of MPEG1. In FIG. 2, a first header 2-1 is at the start of the frame. Then, coded signals for channel A are inserted into an area 2-2, and coded signals for channel B are inserted into an area 2-3.

A coded signal for channel A to be reproduced at time t=t0 is inserted into an area 2-8, and a coded signal to be reproduced at time t=t1 is inserted into an area 2-10. A coded signal for channel B to be reproduced at time t=t0 is inserted into an area 2-9, and a coded signal to be reproduced at time t=t1 is inserted into an area 2-11.

Next, a second header 2-4 is inserted, which is followed by coded signals for three channels. Specifically, the second header 2-4 is followed by an area 2-5 for channel C, an area 2-6 for channel D, and an area 2-7 for channel E. For example, a coded signal for channel C to be reproduced at time t=t0 is inserted into an area 2-12, and a coded signal to be reproduced at time t=t1 is inserted into an area 2-15. A coded signal for channel D to be reproduced at time t=t0 is inserted into an area 2-13, and a coded signal for channel E to be reproduced at time t=t0 is inserted into an area 2-14.

In this example, a bit stream in which coded signals for five channels of MPEG2 are discretely disposed timewise is shown, but any bit stream in which coded signals to be reproduced simultaneously are discretely disposed timewise can be used for the present invention.

In the case where the coded signals for channels A and B to be reproduced at time t=t0 are read by the information transmission section 2, then transmitted the audio decoding section 3 and then decoded real-time, such signals are in the areas 2-8 and 2-9 which are proximate to each other timewise.

In order to reproduce the coded signals only in two channels A and B simultaneously, the coded signals can be decoded while being transmitted in a general FIFO format.

However, there are also coded signals to be reproduced at time t=t0 in the areas 2-5, 2-6 and 2-7 for channels C, D and E which are separated from the areas 2-8 and 2-9 for channels A and B by the second header 2-4. If the coded signals for the five channels are decoded while being transmitted in a general FIFO format, the coded signals for channels C, D and E are reproduced with a delay with respect to the coded signals for channels A and B.

According to a conventional method performed to avoid such an inconvenience, the coded signals are reproduced in the following manner. At least the coded signals for channels A and B to be reproduced at time t=t1 and later are temporarily stored in the memory. Then, in response to the input of the coded signals for channels C, D and E to be reproduced at time t=t0, the reproduction of the coded signals to be reproduced at time t=t0 in all the channels is started. Next, when at least the coded signals to be reproduced at time t=t1 and later for channels A and B are read and the coded signals to be reproduced at time t=t1 for channels C, D and E are input, the reproduction of the coded signals to be reproduced at time t=t1 and later in all the channels is performed.

In such a conventional method, a memory which is capable of high-speed access and has a sufficiently large capacity to temporarily store the coded signals for channel A and B to be reproduced at time t=t1 and later.

In this example, each of the memory areas in the coded signal memory section 1 (FIG. 1) can be sequentially pointed by the actual pointer and the temporary pointer in the information transmission section 2. Thus, the coded signals stored in the memory areas are read in an arbitrary order and given to the audio decoding section 3 in the same order. For example, a coded signal for channel i to be reproduced at time t=t0 stored in a memory area 1-4a is pointed by the actual pointer in the information transmission section 2, and a coded signal for channel k to be reproduced at time t=t0 stored in a memory area 1-5a is pointed by the temporary pointer in the information transmission section 2. These coded signals are transmitted to the audio decoding section 3. In the audio decoding section 3, the coded signals are sent to and decoded by the decoding controller 4b. The resultant audio signals to be reproduced at time t=t0 are temporarily stored in memory areas 1-4b and 1-5b in the decoder memory 5.

Then, a coded signal for channel i to be reproduced at time t=t1 stored in a memory area 1-6a is pointed by the actual pointer in the information transmission section 2, and a coded signal for channel k to be reproduced at time t=t1 stored in a memory area 1-7a is pointed by the temporary pointer in the information transmission section 2. These coded signals are transmitted to the audio decoding section 3. The coded signals are sent to and decoded by the decoding controller 4b. The resultant audio signals to be reproduced at time t=t1 are temporarily stored in memory areas 1-6b and 1-7b in the decoder memory 5.

In the case where coded signals for channel h are stored in the coded signal memory section 1, when a memory area storing the coded signal for channel i to be reproduced at time t=t0 is pointed by the actual pointer, a memory area storing a coded signal for channel h to be reproduced at time t=t0 is pointed by the temporary pointer.

It is apparent that, by causing the memory areas 1-4a and 1-6a (FIG. 1) to correspond to the memory areas 2-8, 2-9, 2-10 and 2-11 (FIG. 2) storing the coded signals for channels A and B, and also causing the memory areas 1-5a and 1-7a (FIG. 1) to correspond to the memory areas 2-12, 2-13, 2-14, 2-15, 2-16 and 2-17 (FIG. 2) storing the coded signals for channels C, D and E, the, coded signals for the channels A and B and the coded signals for channels C, D and E, which are stored in the coded signal memory section 1 in the form of a bit stream defined by MPEG2, can be decoded simultaneously.

By reading the coded signals temporarily stored in the decoder memory 5 and sending the coded signals to a reproduction section (not shown), stereo sound including surround sound can be reproduced in real-time by the reproduction section.

By controlling the actual pointer and the temporary pointer by the pointer controller 4a so as to sequentially read the coded signals from the coded signal memory section 1 as described above, the code amount of the coded signals to be temporarily stored in the decoder memory 5 is relatively small. Therefore, the memory capacity required for the decoder memory 5 can be minimized. This provides an advantage that, in the case where the coded signal memory section 1, the information transmission section 2 and the audio decoding section 3 are integrated into one LSI chip as a DSP (digital signal processor), the capacity of the entire memory of the LSI chip is reduced and thus the DSP chip size is decreased.

In this example, the actual pointer is used for pointing the coded signals for channels A and B, but the present invention is not limited to this. The same effect is achieved in the case where, for example, one coded signal is pointed by a temporary pointer, and after the coded signal is transmitted to the audio decoding section 3, the actual pointer is advanced to the position of the temporary pointer. In this example, a DRAM is assumed to be the coded signal memory section 1, but any other type of memory which can store coded signals can be used.

In this example, the information transmission section 2 includes a buffer memory having one actual pointer and one or more temporary pointers, but any other type of device which can read a coded signal from an arbitrary memory area of the coded signal memory section 1 and transmit the coded signal to the audio decoding section 3 can be used as the information transmission section 2.

Example 2

Figure 3:
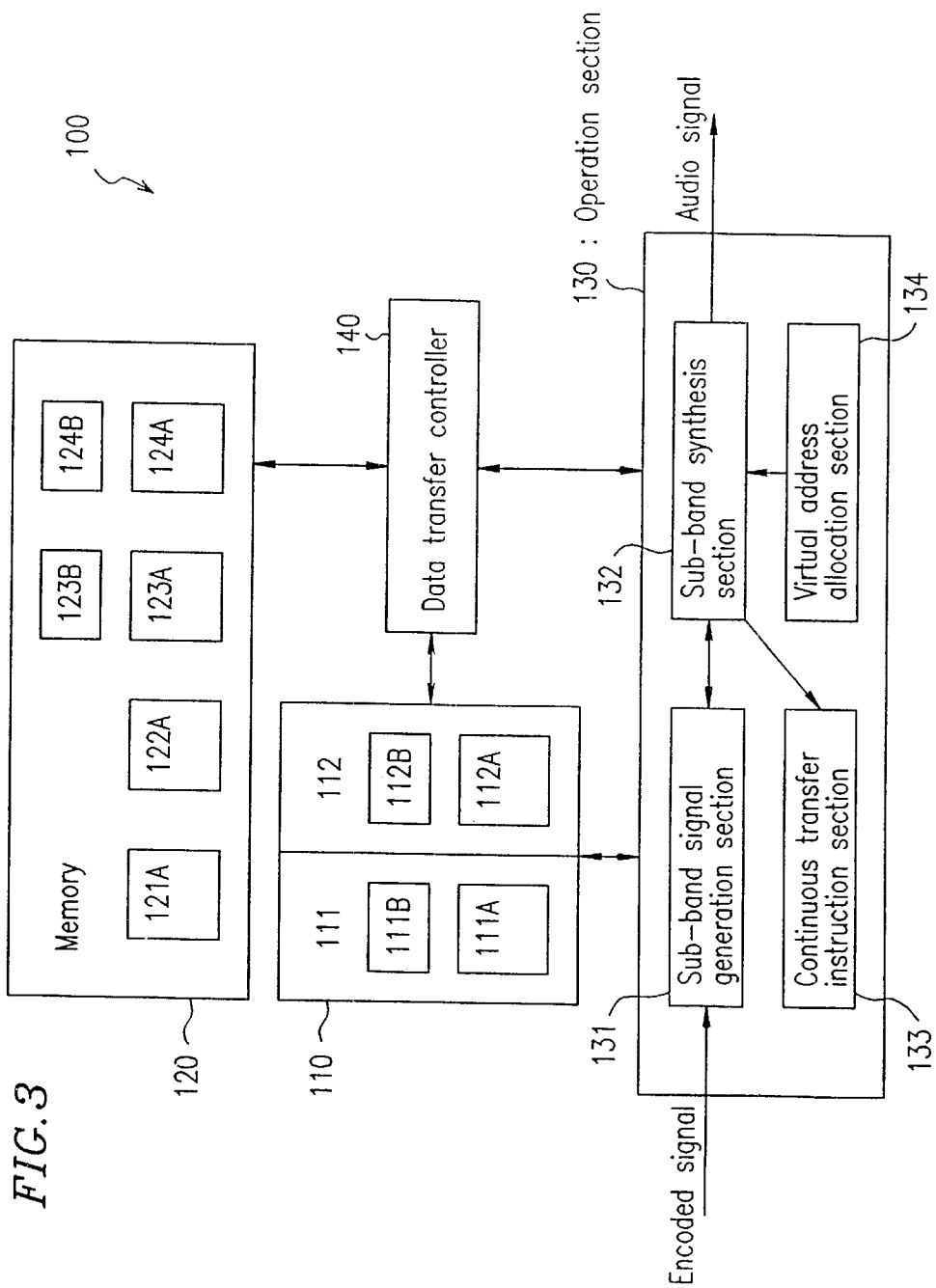
FIG. 3 is a block diagram of an audio decoding device in a second example according to the present invention.

FIG. 3 is a block diagram of an audio decoding device 100 in a second example according to the present invention. The audio decoding device 100 receives coded signals for multi-channels of the layer 2 of MPEG2 (having four channels) and decodes the coded signals into an audio signal. The layer 2 of MPEG2 is described in detail in ISO/IEC 11172-3:1993 and 13818-3:1996.

The audio decoding device 100 includes a first memory section 110, a second memory section 120, an operation section 130, and a data transfer controller 140. The first memory section 110 includes an SRAM capable of high-speed access, which is divided into a memory area 111 (first memory area) and a memory area 112 (second memory area). An important signal processing section of the audio decoding device 100 includes one-chip multimedia processor, which includes an internal memory. The first memory section 110 is a memory area of the internal memory which is saved for processing audio data.

The first memory area 111 stores audio data for x channels, where x is an integer changing in the range of 1 through n, and includes two memory areas 111A and 111B. The memory area 111A stores sub-band synthesis filter data for X channels (corresponding to V produced by matrix processing for sub-band synthesis in the MPEG), and the memory area 111B stores sub-band signal data for X channels. The second memory area 112 stores audio data for Y channels, where y is an integer changing in the range of 1 through n and different from X, and includes two memory areas 112A and 112B. The memory area 112A stores sub-band synthesis filter data for Y channels, and the memory area 112B stores sub-band signal data for Y channels. In the following description, n=4.

The second memory section 120 is a memory including an inexpensive large capacity DRAM externally connected to the processor. The second memory section 120 includes memory areas 121A through 124A, 123B and 124B. The memory areas 121A through 124A each store sub-band synthesis filter data for one channel. For example, the sub-band synthesis filter data for a first channel is stored in the memory area 121A, the sub-band synthesis filter data for a second channel is stored in the memory area 122A, the sub-band synthesis filter data for a third channel is stored in the memory area 123A, and the sub-band synthesis filter data for a fourth channel is stored in the memory area 124A. The sub-band signal data for the third channel is stored in the memory area 123B, and sub-band signal data for the fourth channel is stored in the memory area 124B.

The memory areas 111A and 112A in the first memory section 110 and the memory areas 121A through 124A in the second memory section 120 are all of an identical size. For a more practical description, the area of each of these memory areas can include addresses 1 through 2048 (0x800 in hexadecimal). The memory areas 111B and 112B in the first memory section 110 and the memory areas 123B and 124B in the second memory section 120 are all of an identical size. For a more practical description, the area of each of these memory areas can include addresses 1 through 768 (0x300 in hexadecimal).

The operation section 130 includes a sub-band signal generation section 131, a sub-band synthesis section 132, a continuous transfer instruction section 133, and a virtual address allocation section 134.

The sub-band signal generation section 131 decodes a coded signal input from an external device into a sub-band signal. The sub-band synthesis section 132 performs channel-by-channel sub-band synthesis filter operation using the sub-band synthesis filter data and the sub-band signals to generate an audio signal. The continuous transfer instruction section 133 designates a specific memory area in each of the first memory section 110 and the second memory section 120 and instructs the data transfer controller 140 to perform one or more data transfers.

The virtual address allocation section 134 assumes a virtual address to exist following the actual address at a termination point of each of the memory areas 111A and 112A, and causes a start point of the virtual address to correspond to the actual address at the start of each of the memory areas 111A and 112A. The virtual address allocation section 134 further causes virtual addresses to correspond to the actual addresses in this manner sequentially.

The data transfer controller 140 transfers data from the first memory section 110 to the second memory section 120 or from the second memory section 120 to the first memory section 110 by the instruction of the continuous transfer instruction section 133.

The operation section 130 instructs data transfer between one of the memory area 111 and 112 and the second memory section 120 connected to the processor. During the data transfer, the operation section performs sub-band synthesis filter operation for one channel using the other memory 111 or 112.

Thus, the generation of an audio signal and the transfer of the data are parallel-processed. For example, when the data transfer is performed between the first memory area 111 in the first memory section 110 and the second memory section 120, the operation section 130 performs the operation using the data in the second memory area 112 in the first memory section 110. When the data transfer is performed between the second memory area 112 and the second memory section 120, the operation section 130 performs the operation using the data in the first memory area 111.

As shown by the format described in ISO/IEC 11172-3:1993 and 13818-3:1996, the number of sub-band signals generated by the sub-band signal generation section 131 at one time is 32 for each channel. The sample number Sn of the sub-band signals in one frame is 1152 per channel. The sample number Sn of the sub-band signals generated by the sub-band signal generation section 131 for each channel in one frame is 32×N, where N is an integer of 1 through 36 inclusive.

Furthermore, the minimum sample number of the sub-band signals required for one-time sub-band synthesis filter operation performed by the sub-band synthesis section 132 is 32 per channel. First, matrix processing is performed using the sub-band signals of 32 samples and the cosine coefficient to update 1/16 of the continuous sub-band synthesis filter data. Then, the operation including multiplication and addition is performed, using coefficient D of the synthesis window (hereinafter, referred to simply as the "coefficient D") to generate 32-sample audio signals. The 32-sample audio signals are each obtained by performing the operation including multiplication and addition 16 times. At this point, the sub-band synthesis filter data used in the operation are assigned sequentially sample by sample, starting from the sample newly updated. Specifically, one sample corresponding to 1/16, newly updated, of the sub-band synthesis filter data is first assigned, and next one sample corresponding to 1/16 updated by the immediately previous operation is assigned. This manner of assignment is repeated. Thus, the process shown in FIGS. 4, 5 and 6 is performed.

In this example, the value of N is set to 6 for simplifying the description. Specifically, the sample number of the sub-band signals generated at one time by the sub-band signal generation section 131 is 192 (32×6). The sub-band synthesis section 132 performs the sub-band synthesis filter operation six times per channel. Thus, 192-sample (32×6) audio signals are generated. The sub-band synthesis filter data updated by the sub-band synthesis filter operation occupies 6/16 of the entire sub-band synthesis filter data.

Figure 4:
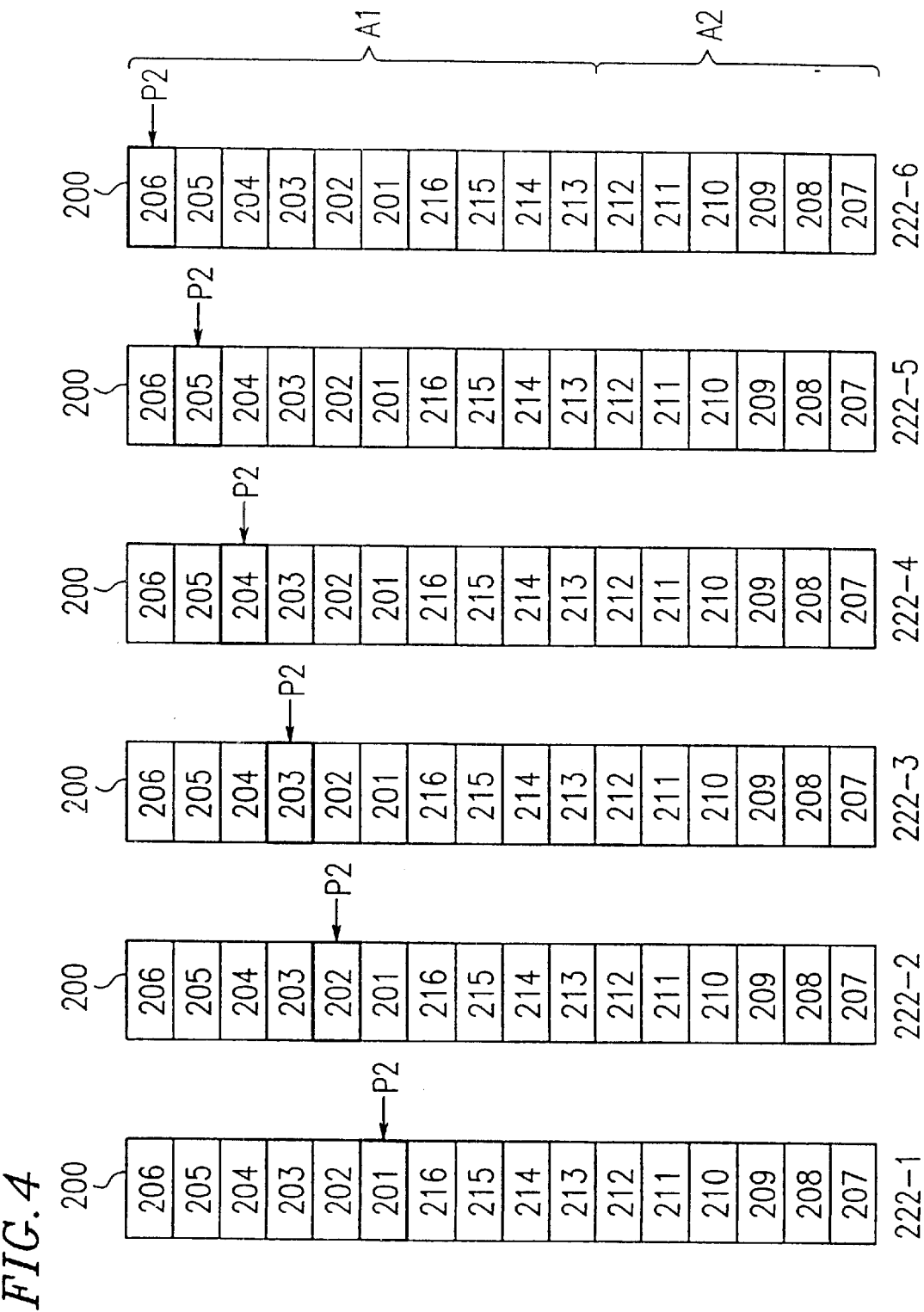
FIGS. 4, 5 and 6 are views showing the arrangement of sub-band synthesis filter data and the over-time change thereof in the audio decoding device shown in FIG. 3.
Figure 5:
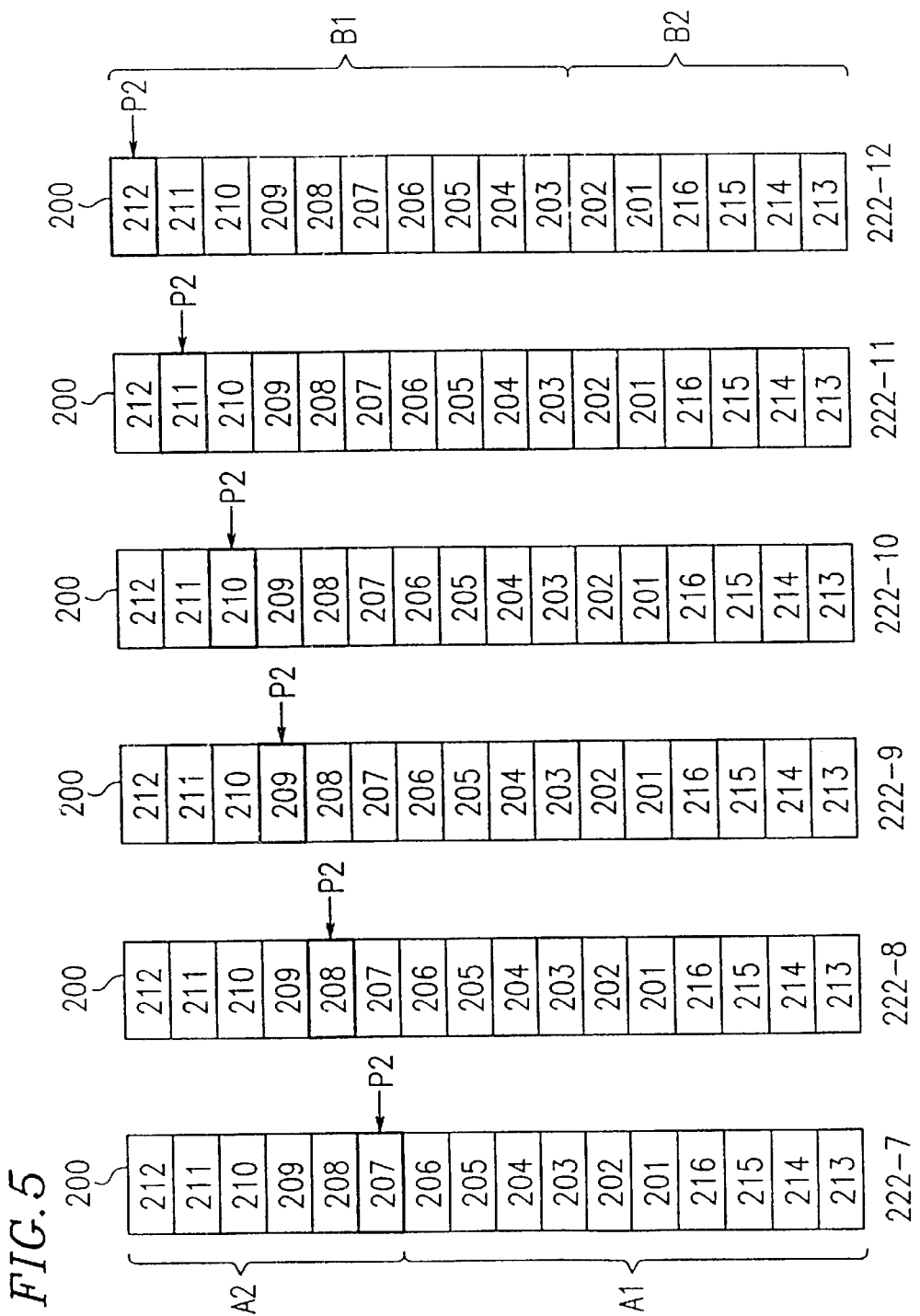
Figure 6:
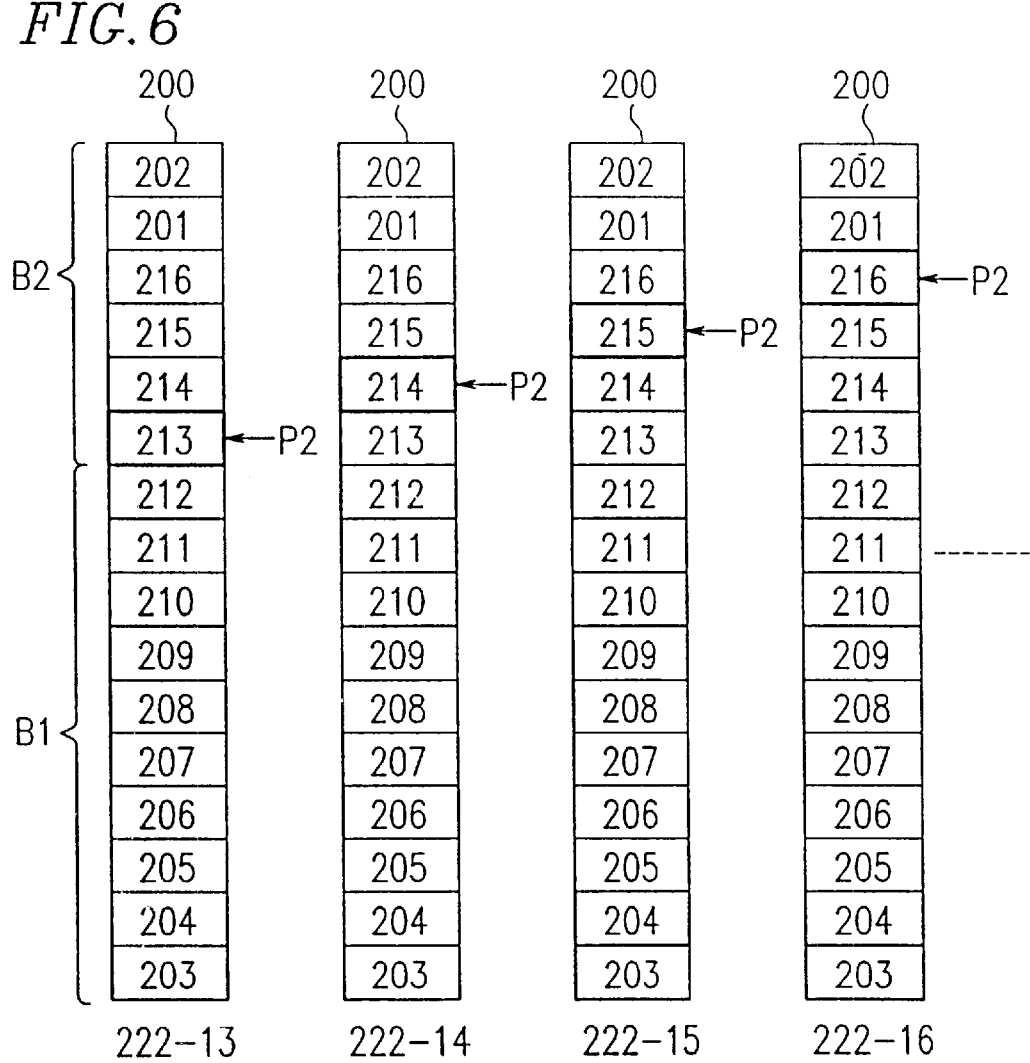

FIGS. 4, 5 and 6 show the arrangement of the sub-band synthesis filter data generated per channel and the over-time change thereof. In FIGS. 4, 5 and 6, a plurality of rectangular areas 200 each show the entire sub-band synthesis filter data. The sub-band synthesis filter data 200 is divided into 16 data areas 201 through 216. Reference numerals 222-1 through 222-16 indicate the order of the over-time change. The time interval between two adjacent rectangular areas 200 corresponds to the time period required to perform the sub-band synthesis filter data once. The data changes overtime with the data 222-1 being the oldest and the data 222-16 being the newest with the time progressing therebetween. In this example, FIG. 4 shows the arrangement and the position of a pointer P2 of data 222-1 through 222-6, FIG. 5 shows the arrangement and the position of the pointer P2 of data 222-7 through 222-12, and FIG. 6 shows the arrangement and the position of the pointer P2 of data 222-13 through 222-16.

The arrow shown to the right of each rectangular area 200 represents a pointer P2 showing the area in which the data is updated. As described above, the sample number of the sub-band signals for each channel generated at one time is 192 (32×6) and corresponds to the sub-band synthesis filter operation performed six times. Assuming that the data 222-1 is sub-band synthesis filter data updated by the first sub-band synthesis filter operation immediately after the sub-band signal generation, 192-sample sub-band signals are generated by the sub-band signal generation section 131 during the change from the data 222-6 to the data 222-7 and during the change from the data 222-12 to the data 222-13. During the above time periods, data is transferred between the first memory section 110 and the second memory section 120 by the control by the data transfer controller 140. When the sub-band synthesis filter data is in the state shown in the rectangular area 222-1, the data in the data area 201 is updated. When the sub-band synthesis filter data is in the state shown in the rectangular area 222-2, the data in the data area 202 is updated. In the same manner, when the sub-band synthesis filter data is in the state shown in the rectangular areas 222-3 through 222-16, the data in the data area 203 through 216 is updated, respectively. Then, the data in the area 222-1 is again updated.

FIG. 7 is a table showing the correspondence between the virtual addresses which are virtually allocated to the first memory section 110 by the virtual address allocation section 134 and the actual addresses. As can be appreciated from FIG. 7, the addresses included in the memory areas 111 and 112 are respectively 0 through 3071 (0x000) through 0xbff in hexadecimal). The virtual addresses and the actual addresses have the same values where the virtual addresses are 0x000 through 0xbff. However, the virtual addresses 0xc00 through 0xfff indicate the actual addresses 0x000 through 0x7ff, respectively.

For example, the memory area 111B in the first memory area 111 is allocated to the addresses 0x100 through 0x3ff, and the memory area 111A is allocated to the addresses 0x400 through 0xbff. In the same manner, the memory area 112B in the second memory area 112 is allocated to the addresses 0x100 through 0x3ff, and the memory area 112A is allocated to the addresses 0x400 through 0xbff. Since the virtual address 0xc00 in each of the memory areas 111 and 112 is caused to correspond to the actual address 0x400, the virtual address 0xc00 indicates the leading address of each of the memory areas 111A and 112A. The following virtual addresses indicates the actual addresses in the same manner.

Figure 8:
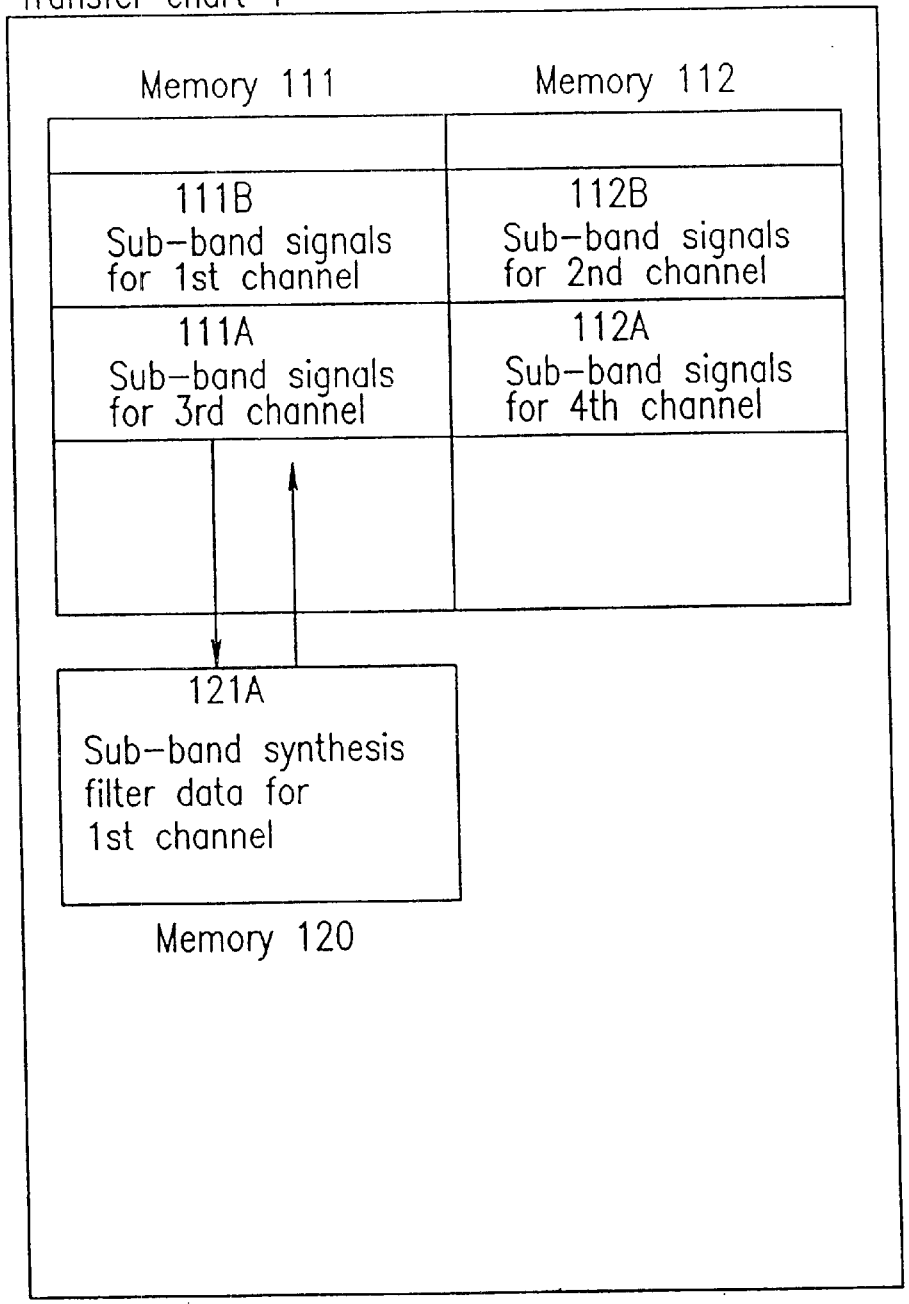
FIGS. 8 through 13 are time charts for data transfer performed in the audio decoding device shown in FIG. 3.
Figure 9:
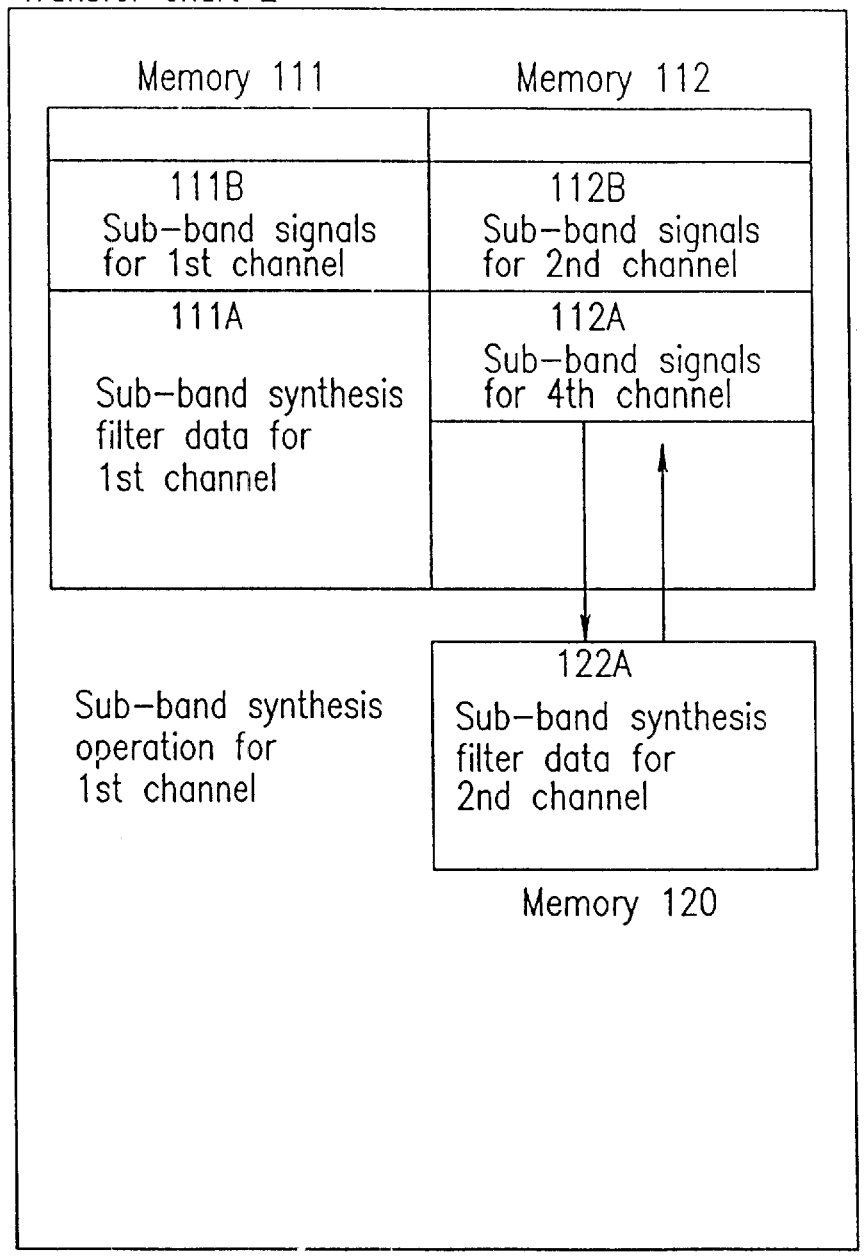
Figure 10:
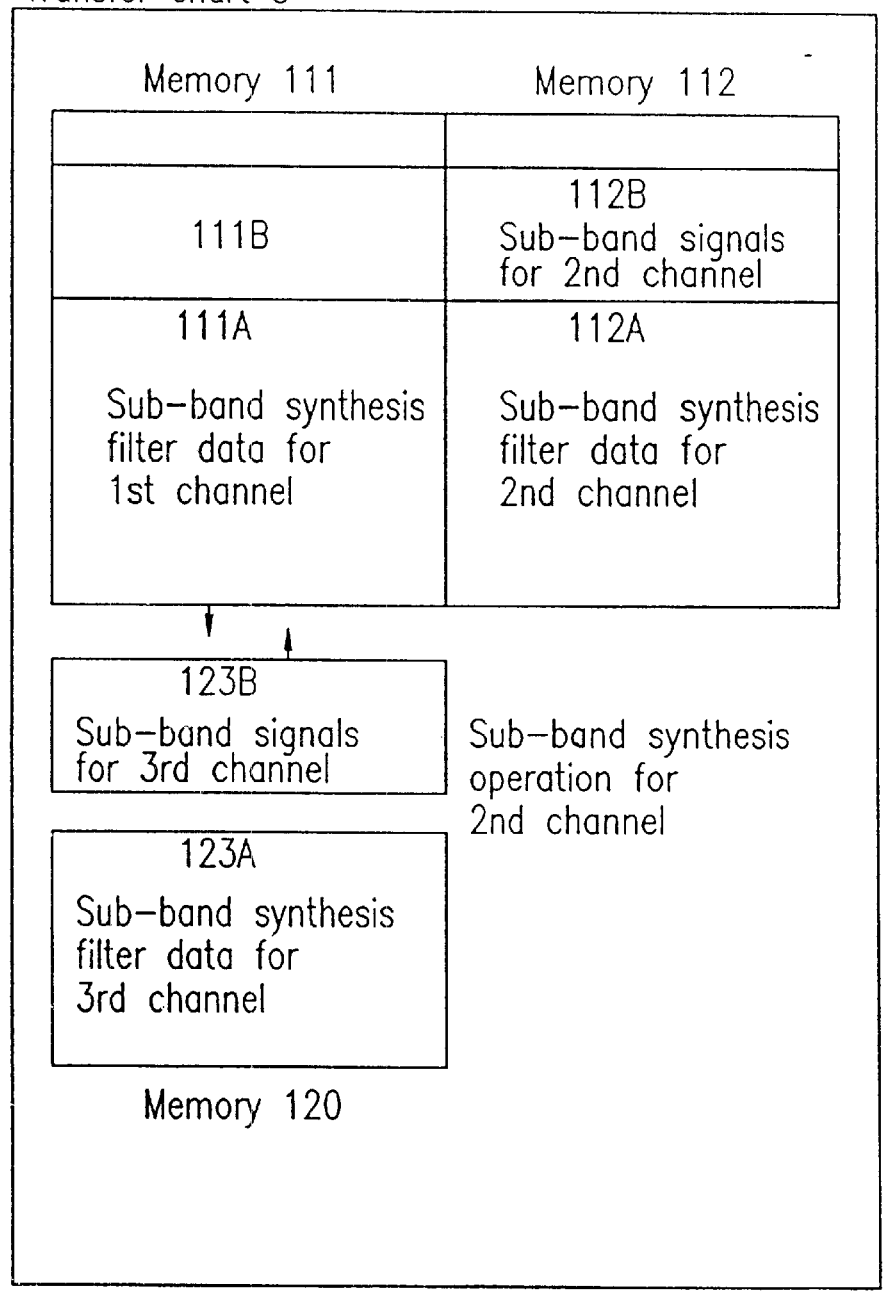
Figure 11:
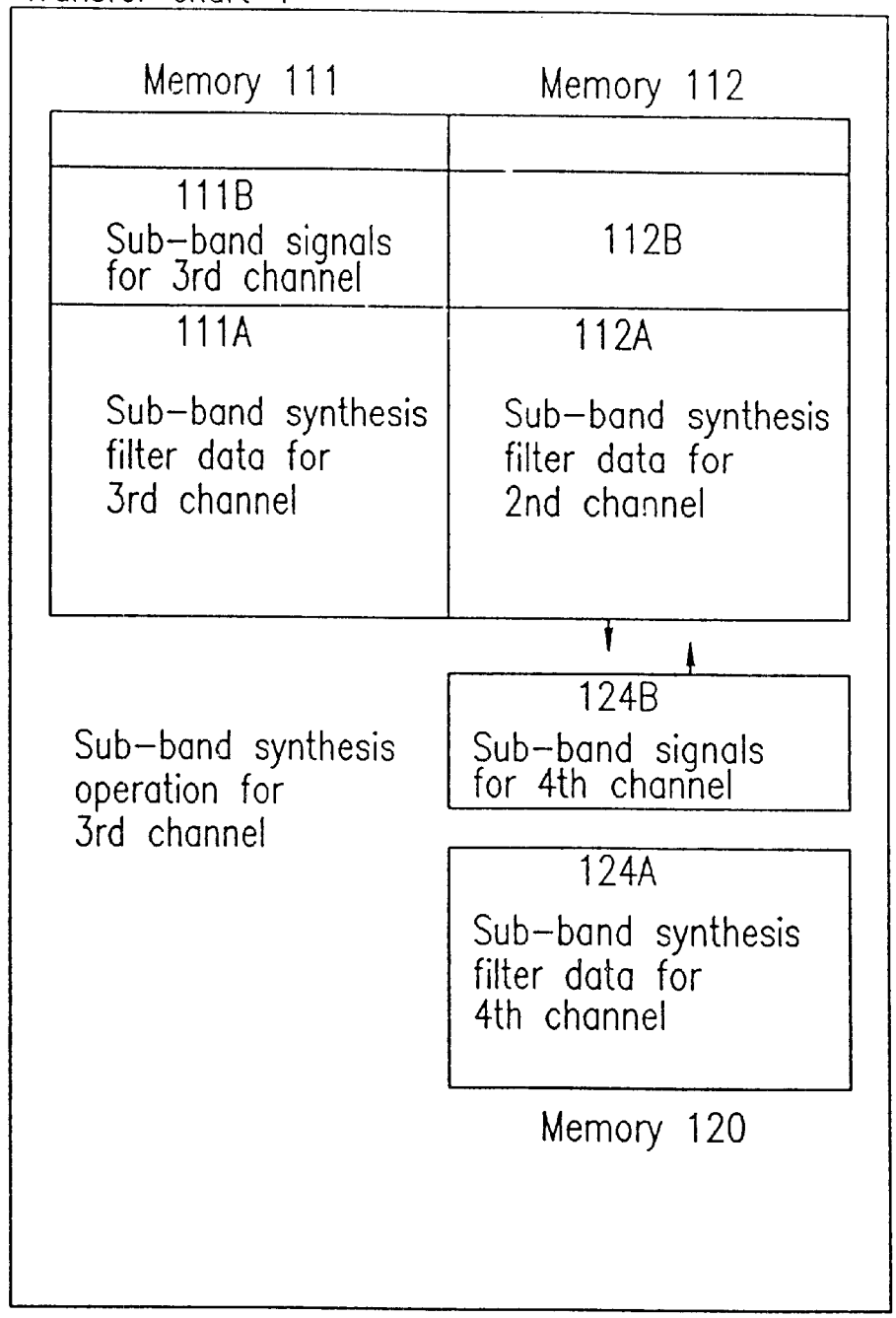
Figure 12:
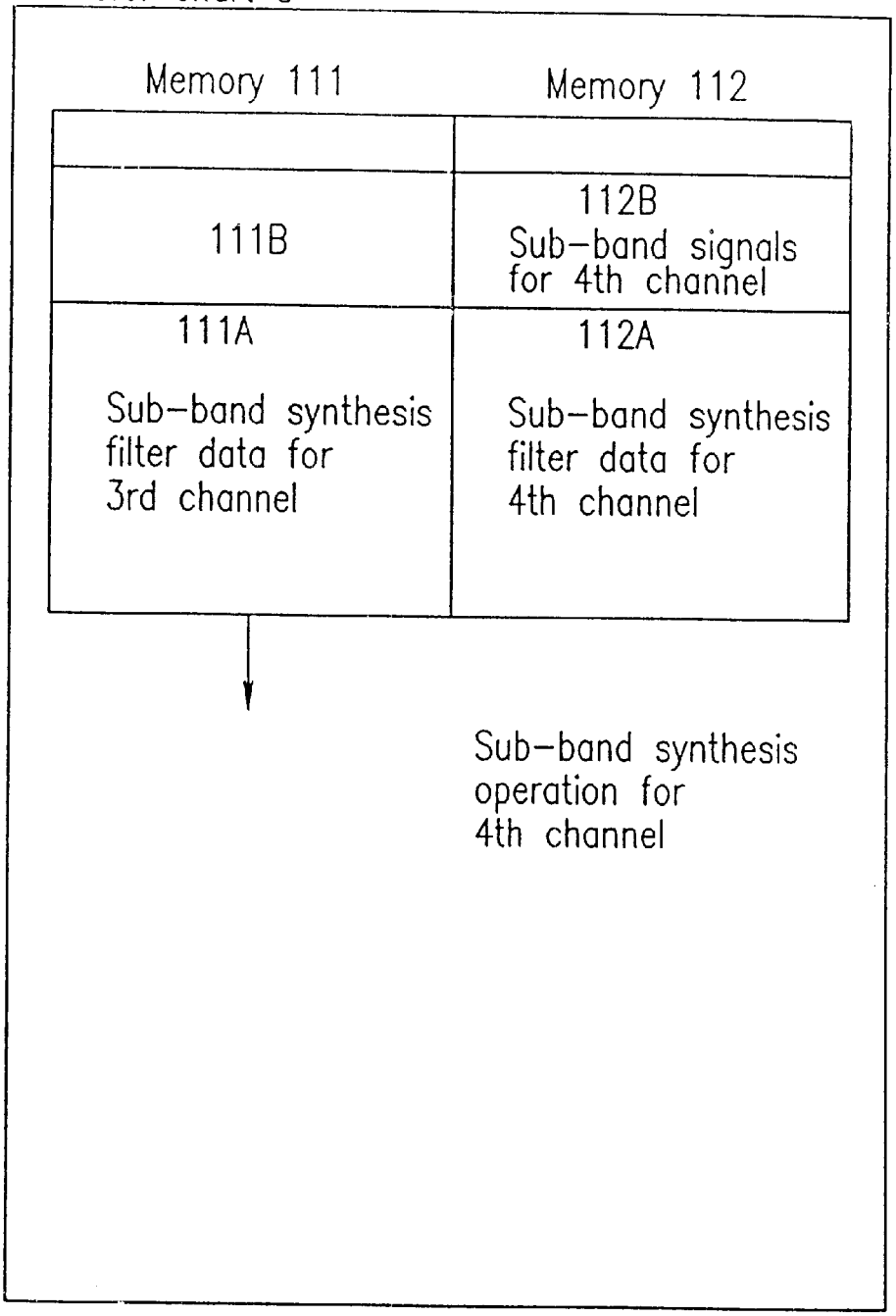
Figure 13:
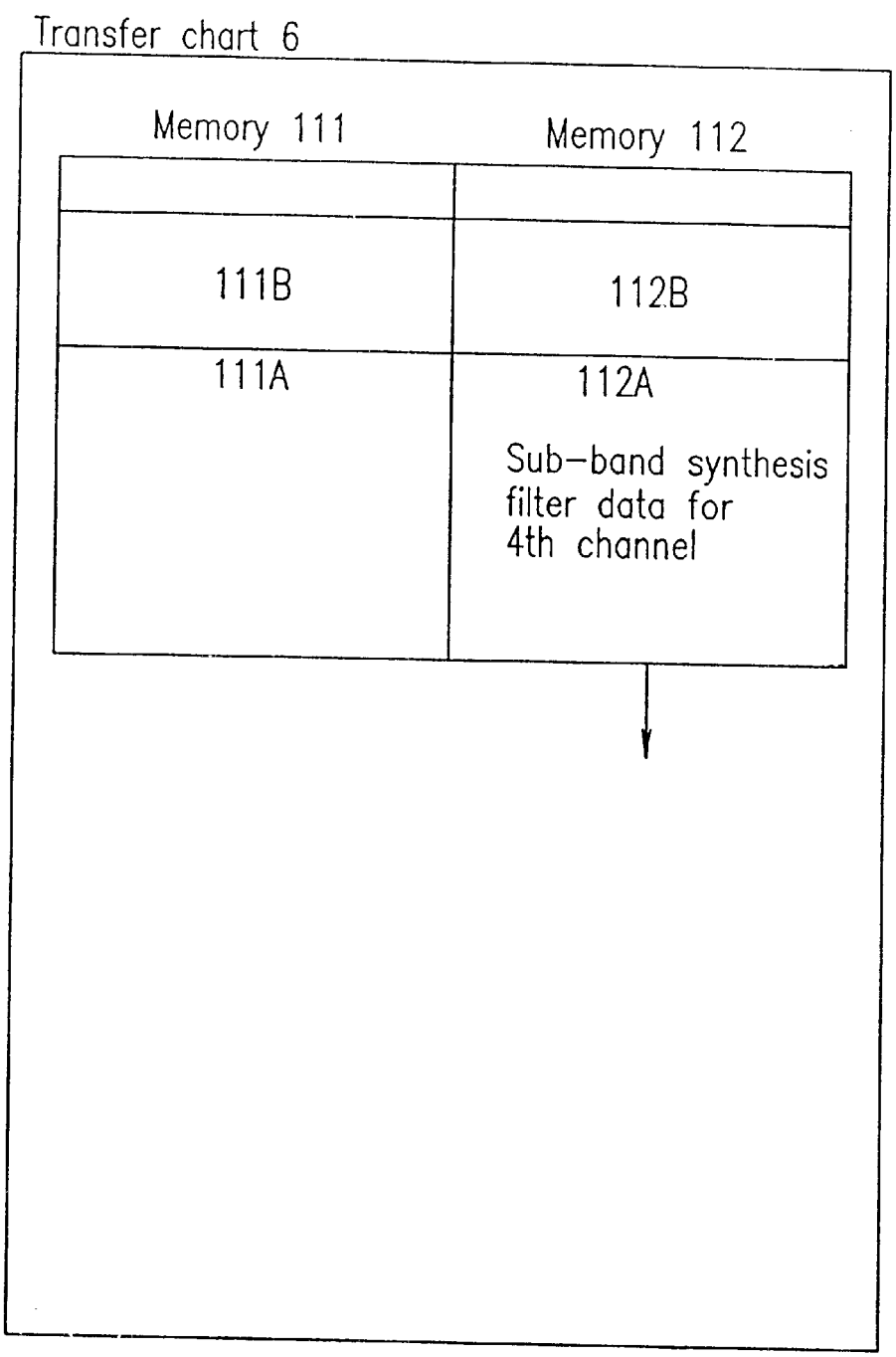

FIGS. 8 through 13 are timing charts of data transfer. FIGS. 8 through 13 respectively show transfer charts 1 through 6. Transfer chart 1 in FIG. 8 shows data transfer before sub-band synthesis, and transfer chart 2 in FIG. 9 shows data transfer during sub-band synthesis for the first channel. Transfer chart 3 in FIG. 10 shows data transfer during sub-band synthesis for the second channel, and transfer chart 4 in FIG. 11 shows data transfer during sub-band synthesis for the third channel. Transfer chart 5 in FIG. 12 shows data transfer during sub-band synthesis for the fourth channel, and transfer chart 6 in FIG. 13 shows data transfer after sub-band synthesis.

The audio decoding device 100 having the above-described structure operates in the following manner.

First, when a bit stream of multi-channels of MPEG2 (four channels) is input, the operation section 130 (FIG. 3) gives the bit stream to the sub-band signal generation section 131, which decodes the bit stream into four-channel sub-band signals. Then, the coded signals for the i'th channel (i=1 in this example) are written into the memory area 111B, and the coded signals for the j'th channel (j=2 in this example) are written into the memory area 112B. The coded signals for the k'th channel (k=3 in this example) are written into a part of the memory area 111A, and the coded signals for the k'th channel (l=4 in this example) are written into a part of the memory area 112A.

Then, the continuous transfer instruction section 133 instructs the data transfer controller 140 to transfer data in the following manner based on a request from the operation section 130. As shown in transfer chart 1 (FIG. 8), the sub-band signal data for the k'th channel stored in the memory area 111A in the first memory section 110 is transferred to the memory area 123B in the second memory section 120. The sub-band synthesis filter data for the i'th channel stored in the memory area 121A in the second memory section 120 is transferred to the memory area 111A in the first memory section 110.

Thus, the data transfer controller 140 transfers the sub-band signal data for the k'th channel from the memory area 111A to the memory area 123B, and immediately thereafter, transfers the sub-band synthesis filter data for the i'th channel from the memory area 121A to the memory area 111A. When the data transfer is completed, the data transfer controller 140 notifies the operation section 130 of the completion of the data transfer.

The operation section 130, when learning the completion of the data transfer, requests the continuous transfer instruction section 133 to transfer data in the following manner. As shown in transfer chart 2 (FIG. 9), the sub-band signal data for the l'th channel stored in the memory area 112A in the first memory section 110 is transferred to the memory area 124B in the second memory section 120. The sub-band synthesis filter data for the j'th channel stored in the memory area 122A in the second memory section 120 is transferred to the memory area 112A in the first memory section 110. Parallel to such transfer, the operation section 130 starts the sub-band synthesis filter operation for the i'th channel by the sub-band synthesis section 132 using the data in the first memory area 111.

At this point, the sub-band synthesis filter data in the data area 201 of the data 222-1 (FIG. 4) is updated. In other words, the data at addresses 0x680 through 0x6ff in the first memory area 111 is updated. After that, the 32-sample audio signals are obtained by performing the operation including multiplication and addition 16 times. In order to uniformize the order of assignment by the coefficient D, the sub-band synthesis filter data used in the operation is assigned sequentially sample by sample, starting from the sample newly updated. Specifically, one sample corresponding to ¹⁄₁₆, newly updated, of the sub-band synthesis filter data, i.e., the data in the data area 201 is first assigned, and next one sample corresponding to ¹⁄₁₆ updated by the immediately previous operation, i.e., the data in the data area 216 is assigned. The assignment is performed in this manner in order from the data in the data area 215, 214 . . . to 203 and 202.

When the sub-band synthesis filter data in the data area 206 and later (0x400-) is assigned after the sub-band synthesis filter data in the data area 207 (0xb80 through 0xbff) is assigned, circulating address processing is required on the actual addresses in order to set the addresses. The circulating address processing is performed by the following AND operation. Where the address before conversion is A, the address after the conversion B is:

$$B=\{(A-0x400)\times(0x7f\!f)\}+0x400$$

where x represents the AND operation.

However, the operation section 130 in this example includes the virtual address allocation section 134 and thus does not require the circulating address processing including the AND operation. The data up to sub-band synthesis filter data at the actual addresses 0x400 through 0x7ff, i.e., data areas 206 through 201, 216 and 215 can be allocated by the virtual addresses 0xc00 through 0xfff.

In the subsequent sub-band synthesis filter operation also, as shown in the rectangular area 222-2 (FIG. 4), the data in the data area 202 is updated, and the operation including multiplication and addition is performed using the sub-band synthesis filter data in the data areas 201, 216 through 207, and 206 through 202, thereby obtaining an audio signal.

Furthermore, also in the subsequent sub-band synthesis filter operation, as shown in the rectangular area 222-3.(FIG. 4), the data in the data area 203 is updated, and the operation including multiplication and addition is performed using the sub-band synthesis filter data in the data areas 202 and 201, 216 through 207, and 206 through 203, thereby obtaining an audio signal.

Also in the sixth sub-band synthesis filter operation immediately before the transfer of the audio signal, as shown in the rectangular area 222-6 (FIG. 4), the data in the data area 206 is updated, and the operation including multiplication and addition is performed using the sub-band synthesis filter data in the data areas 205 through 201, 216 through 207 and 206, thereby obtaining an audio signal. As described above, the operation including multiplication and addition with the coefficient D can be performed without circulating address processing in any of the sub-band synthesis filter operation performed six times.

The data transfer controller 140 performs data transfer while the operation section 130 performs the sub-band synthesis filter operation. When the transfer is completed, the data transfer controller 140 notifies the operation section 130 of the completion of the data transfer. When both the data transfer and the sub-band synthesis filter operation for the i'th channel are completed, the continuous transfer instruction section 133 instructs the data transfer controller 140 to transfer an audio signal in the following manner, based on a request of the operation section 130.

As shown in transfer chart 3 (FIG. 10), the sub-band synthesis filter data for the i'th channel stored in the memory area 111A in the first memory section 110 is transferred to the memory area 121A in the second memory section 120. The sub-band synthesis filter data for the k'th channel stored in the memory area 123A in the second memory section 120 is transferred to the memory area 111A in the first memory section 110. The sub-band signal data for the k'th channel stored in the memory area 123B in the second memory section 120 is transferred to the memory area 111B in the first memory section 110. The sub-band synthesis section 132 starts the sub-band synthesis filter operation for the j'th channel using the data in the second memory area 112 parallel to the above-described transfer operation.

The transfer of the sub-band synthesis filter data for the i'th channel and the k'th channel is performed between the rectangular areas 222-6 (FIG. 4) and the rectangular areas 222-7 (FIG. 5). The transfer of the sub-band synthesis filter data for the i'th channel is performed as follows. The area 200 is divided into A1 (FIG. 4) including the data areas 212 through 207 and A2 including the data areas 206 through 201 and 216 through 213, and the data in A2 is first transferred and then the data in A1 is transferred. By such an operation, the order of assigning the addresses of the sub-band synthesis filter data for the subsequent transfer of the data for the i'th channel is exactly the same as that of the previous transfer.

In this stage, the sub-band synthesis filter operation for the j'th channel is performed in the same manner as for the i'th channel using the second memory area 112. The data transfer controller 140 performs data transfer while the sub-band synthesis section 132 performs the sub-band synthesis filter operation. When the transfer is completed, the data transfer controller 140 notifies the operation section 130 of the completion of the data transfer.

When both the data transfer and the sub-band synthesis filter operation for the j'th channel are completed, the operation section 130 requests the continuous transfer instruction section 133 to transfer data in the following manner. As shown in transfer chart 4 (FIG. 11), the sub-band synthesis filter data for the j'th channel stored in the memory area 112A in the first memory section 110 is transferred to the memory area 122A in the second memory section 120. The sub-band synthesis filter data for the l'th channel stored in the memory area 124A in the second memory section 120 is transferred to the memory area 112A in the first memory section 110. The sub-band signal data for the l'th channel stored in the memory area 124B in the second memory section 120 is transferred to the memory area 112B in the first memory section 110. The sub-band synthesis section 132 starts the sub-band synthesis filter operation for the k'th channel using the data in the first memory area 111 parallel to the above-described transfer operation.

The transfer of the sub-band synthesis filter data for the j'th channel and the l'th channel is performed between the rectangular areas 222-6 (FIG. 4) and the rectangular areas 222-7 (FIG. 5). The area 200 is divided into A1 (FIG. 4) including the data areas 206 through 201 and 216 through 213 and A2 including the data areas 212 through 207, and the data in B2 is first transferred and the data in B1 is transferred.

When both the data transfer and the sub-band synthesis filter operation for the k'th channel are completed, the operation section 130 requests the continuous transfer instruction section 133 to transfer data in the following manner. As shown in transfer chart 5 (FIG. 12), the sub-band synthesis filter data for the k'th channel stored in the memory area 111A in the first memory section 110 is transferred to the memory area 123A in the second memory section 120. The sub-band synthesis section 132 starts the sub-band synthesis filter operation for the l'th channel using the data in the second memory area 112.

When both the data transfer and the sub-band synthesis filter operation for the l'th channel are completed, the operation section 130 requests the continuous transfer instruction section 133 to transfer data in the following manner. As shown in transfer chart 6 (FIG. 13), the sub-band synthesis filter data for the l'th channel stored in the memory area 112A in the first memory section 110 is transferred to the memory area 124A in the second memory section 120.

Then, in the next step, 192-sample sub-band signals are generated for each channel by the sub-band signal generation section 131. Next, sub-band synthesis operation and data transfer are performed parallel. The transfer of the sub-band synthesis filter data for any of the channels from the first memory section 110 to the second memory section 120 is performed between the rectangular areas 222-12 (FIG. 5) and the rectangular areas 222-13 (FIG. 6). The area 200 is divided into B1 (FIG. 5) including the data areas 212 through 203 and B2 including the data areas 202, 201 and 216 through 213, and the data in B2 is first transferred and the data in B1 is transferred.

As can be appreciated from the above description, the audio decoding device 100 in this example uses a DRAM, which costs less than an SRAM, for the second memory section 120 and stores the data corresponding to all the channels in the second memory section 120. The data in the second memory section 120 is transferred to the first memory section 110 using the data transfer controller 140 only when necessary. Accordingly, the multi-channel audio signals can be reproduced at a high speed without increasing the capacity of the internal memory in the processor. Since the SRAM need not be connected externally, the cost of the entire device can be reduced.

In the audio decoding device 100 in this example, the sub-band synthesis filter operation and the data transfer can be performed in parallel, and thus the time period required for the operation processing can be shortened by the time period required for the data transfer. Since the data transfer performed once can transfer the amount of data corresponding to the transfer performed a plurality of times, the circulating address processing and the shift processing of the sub-band synthesis filter data need not be done in the sub-band synthesis operation, where a virtual address allocation section is used. Further, since the data transfer can be performed a plurality of times, the data transfer is easier to schedule in accordance with the time period required for data transfer and for generation of the audio signal. Thus, the time loss caused by the data transfer can be reduced and the processing time can be shortened.

In this example, for simplicity of the description, the number n of the channels for input signals are four, the first channel is referred to as i, the second channel is referred to as j, the third channel is referred to as k, and the fourth channel is referred to as 1. The number of channels is not limited to this.

In this example, any method is not specified for the processing performed parallel to the data transfer before the sub-band synthesis for the first channel or the processing parallel to the transfer of the sub-band synthesis filter data for the final channel. Any possible method is usable. For example, after the sub-band synthesis filter data for the final channel is transferred, a signal can be input to generate a sub-band signal. In such a case, loss caused by the data transfer can be reduced.

Example 3

Figure 14:
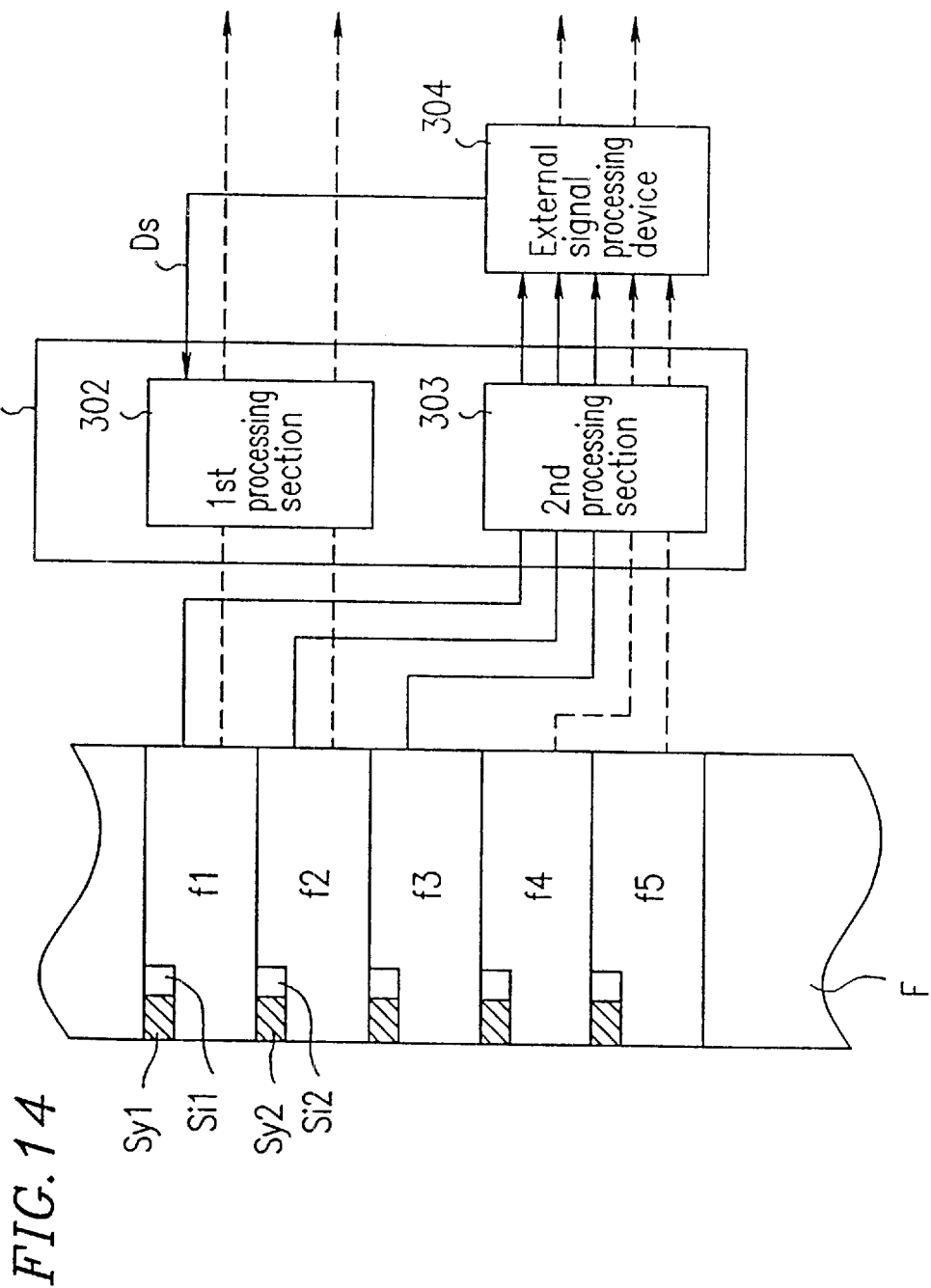
FIG. 14 a block diagram of a signal processing device in a third example according to the present invention.

FIG. 14 is a block diagram of a signal processing device 301 in a third example according to the present invention. The signal processing device 301 includes a first processing section 302 and a second processing section 303, and is connected to an external signal processing apparatus 304 through the second processing section 303.

The signal processing device 301 receives continuous frame data F and extracts an MPEG audio bit stream from the frame data F. Then, the signal processing device 301 reproduces an audio signal from the bit stream to be output. As shown in the left part of FIG. 14, the frame data F includes a first frame f1, a second frame f2, a third frame f3, . . . , and each frame fk (k=1, 2, 3, . . . ) includes an area to which a synchronous word Syk is to be inserted and an area to which side information Sik is to be inserted. The synchronous word is used for detecting the border between two adjacent frames fk, and the side information Sik is used for detecting the frame length.

The first processing section 302 is an internal decoder for extracting one or more frames from the continuous frame data F, then decoding audio data for a specific channel included in the extracted frame, and outputting the decoding result as first output information. The first processing section also estimates and calculates the transmission delay time, which generally corresponds to the time period required for conversion of stream data of the IEC958 format. The conversion is performed by the second processing section 303. When the estimated and calculated transmission delay time has passed, the first processing section 302 decodes the audio data in the extracted frame.

When the data in a frame fi has been decoded by the first processing section 302, the second processing section 303 has already finished processing the frame fi, and is processing at least one frame fi+j (j≧1) positioned after the frame fi. The second processing section 303 extracts audio data for another channel included in any of the frames fi+j (j≧1) and converts the extracted audio data to stream data of a format commonly usable among a plurality of audio reproduction apparatuses. Then, the second processing section 303 outputs the stream data as second output information.

The conversion into the stream data of the common format refers to receiving a frame as input data and converting the frame into non-PCM stream data of the IEC958 format. The second processing section 303 transmits the resultant stream data to the external signal processing apparatus 304 including a decoder for decoding MPEG audio data.

The operation of the signal processing device 301 will be described in more detail in the case where the first processing section 302 and the second processing section 303 alternately perform signal processing.

Figure 15:
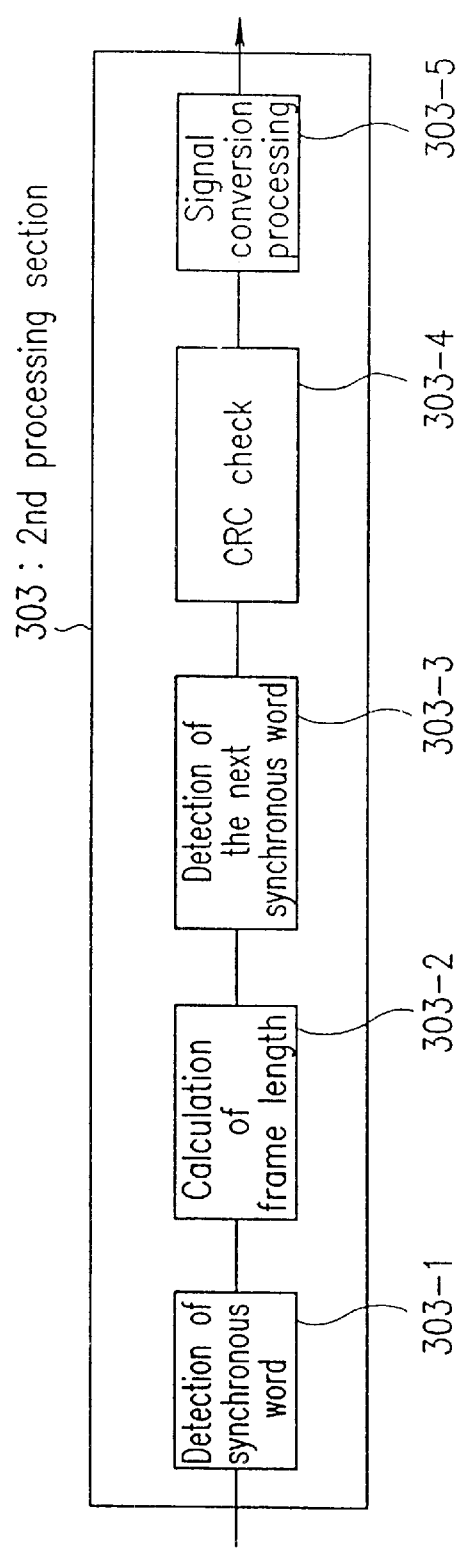
FIG. 15 is a view illustrating signal processing performed by a second processing section in the signal processing device shown in FIG. 14.

FIG. 15 is a block diagram showing signal processing performed by the second processing section 303. When an MPEG audio bit stream is input to the second processing section 303, a synchronous word Syk of the frame is detected in step 303-1. In step 303-2, the frame length is calculated based on the side information Sik of the frame. In step 303-3, it is determined whether or not there is a synchronous word Syk of the next frame forward from the current synchronous word by the frame length detected by step 303-2. In step 303-4, it is determined whether or not there is a data error in the frame by CRC check. In step 303-5, the frame is converted into non-PCM stream data of the IEC958 format and output. Thus, as shown in FIG. 14, the non-PCM stream data (second output information) of the IEC958 format is transmitted from the second processing section 303 to the external signal processing apparatus 304.

Figure 16:
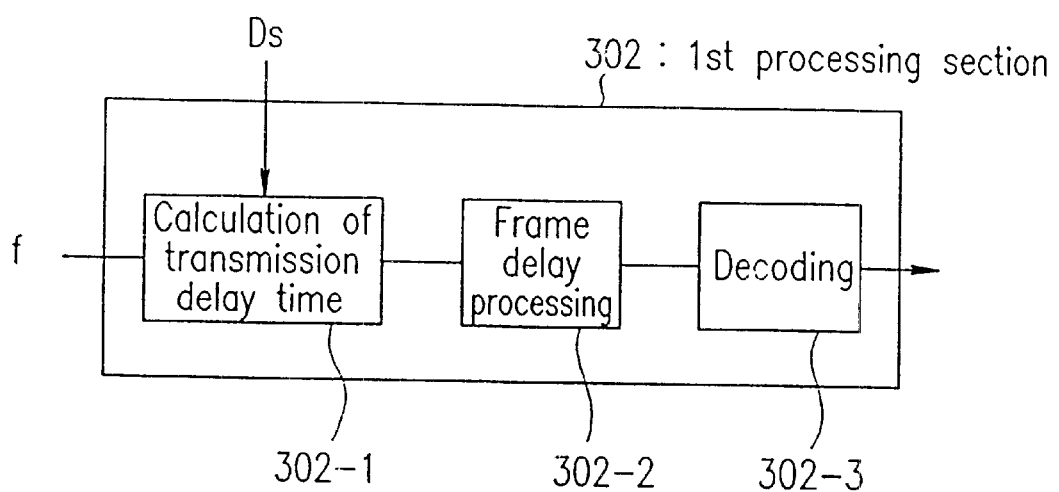
FIG. 16 is a view illustrating signal processing performed by a first processing section in the signal processing device shown in FIG. 14.
Figure 17:
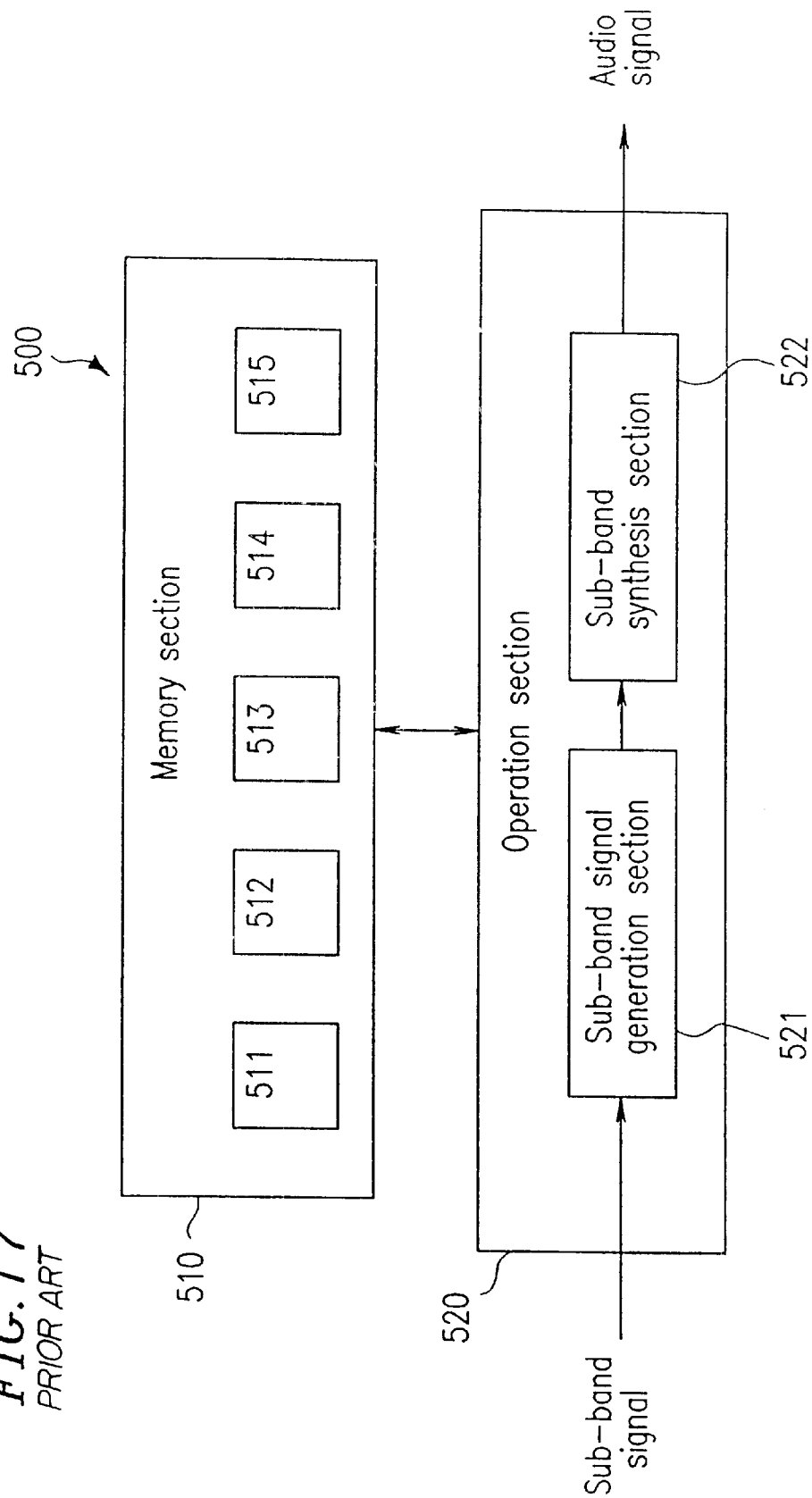
FIG. 17 is a block diagram of a conventional decoding device.

FIG. 16 is a block diagram showing signal processing performed by the first processing section 302. When an MPEG audio bit stream and a decoding start signal Ds from the external signal processing apparatus 304 are input to the first processing section 302, a transmission delay time is calculated in step 302-1 (delay amount determination section). The transmission delay time refers to a time period from when the frame is extracted from the frame data F by the second processing section 303 until the audio data of the frame is received by the external processing apparatus 304. In step 302-2, processing for delaying the decoding start time of the frame by the transmission delay time is performed. In step 302-3, the frame which has been delayed by the transmission delay time is decoded and converted into an audio signal, and the resultant audio signal (first output information) is output.

The signal processing device 301 operates, for example, in the following manner.

First, as shown in FIG. 14, the first frame f1 and the second frame f2 of the frame data F are input to the first processing section 302 and the second processing section 303 simultaneously.

In the second processing section 303, a synchronous word Sy1 is detected from the data of the first frame f1 in step 303-1. In step 303-2, the frame length of the first frame f1 is calculated using the side information Si1. In step 303-3, the existence of a synchronous word Sy2 of the second frame f2 is confirmed. When the synchronous word Sy2 is detected, audio data of the first frame f1 is established. In step 303-4, the data of the first frame f1 is subjected to error detection by CRC check. In final step 303-5, the audio data of the first frame f1 is converted into non-PCM stream data of the IEC958 format. Then, the stream data of the IEC958 format is transmitted to the external signal processing apparatus 304.

In steps 303-1 through 303-4, the frame establishment function is achieved. By the frame establishment function, the synchronous word Syk is detected and the frame length is calculated by the side information Sik, then the synchronous word at the start of the next frame is detected to confirm the existence of one frame, and then data error of the frame is detected. In step 303-5, the frame processing function is achieved. By the frame processing function, in the case where the frame is considered to be established by the frame establishment function, the information indicating the establishment of the frame is added to the stream data; and in the case where the frame is not established, the information indicating the non-establishment of the frame is added to the stream data. Then, the stream data is converted into non-PCM stream data of the IEC958 format which is acceptable to other signal processing apparatuses and the converted data is output.

AS shown in FIG. 16, the first processing section 302 extracts the first frame f1, and approximately after the time when the stream data corresponding to the first frame f1 is received by the external signal processing apparatus 304, the decoding start signal Ds1 is input from the external signal processing apparatus 304.

In step 302-1, the difference between the time when decoding of the audio data of the first frame f1 can be started by the decoder of the first processing section 302 and the time (indicated by the signal Ds1) when the decoding is started by the external signal processing apparatus 304 is calculated as a transmission delay time td1. The transmission delay time td1 represents the time period by which the decoding of the audio data performed by the decoder of the first processing section 302 should be delayed, and is converted into the frame number.

In step 302-2, it is determined whether or not the wait time period until the decoding of the first frame f1 is started by the first processing section 302 exceeds the transmission delay time td1 obtained in step 302-1. If not, the first processing section 302 waits without decoding the audio data of the first frame f1. When the wait time until the decoding of the first frame f1 is started exceeds the transmission delay time td1, the audio data of the first frame is decoded in step 302-3.

By delaying the decoding performed by the first processing section 302 to be synchronous with the decoding of the external signal processing apparatus 304, outputs of the audio signals from the signal processing device 301 and the external signal processing apparatus 304 can be synchronized without providing a buffer for delay therebetween as is required in a conventional apparatus.

In FIG. 14, the transmission delay time corresponds to three frames. In other words, while the second processing section 303 is receiving audio data of the frames f4 and f5, which are delayed with respect to the frames f1 and f2 by three frames, and transmitting the stream data of the IEC958 format, the first processing section 302 receives and decodes the audio data of the frames f1 and f2.

For example, in the case where the first processing section 302 reproduces only the audio signal for the first channel (right forward) and the audio signal for the second channel (left forward) among the multi-channels, the first processing section 302 extracts the audio data for the first and second channels from the frame F and decodes the audio data. In the case where the external signal processing apparatus 304 reproduces the audio signals for the third, fourth and fifth channels (center, right rearward, and left rearward), the second processing section 303 extracts the audio signals for the third, fourth and fifth channels from the frame F. The external signal processing apparatus 304 receives the audio data transmitted from the second processing section 303 and decodes the received audio data. In this case also, the timing by which the audio data for the first and second channels is decoded by the first processing section 302 and the timing by which the audio data for the third, fourth and fifth channels is decoded by the external signal processing apparatus 304 match each other. Thus, five-channel surround sound can be output simultaneously from the respective speakers even when a plurality of reproduction apparatuses are used.

In this example, the unit of transmission delay time corresponds to one frame. The present invention is not limited to this. As long as the signal processing device includes a frame buffer and the data of the frame F is stored in the frame buffer, the transmission delay time can be set to any arbitrary time period which is shorter than the time period corresponding to one frame by pointing any address in the frame buffer with a reading pointer and sequentially reading the audio data by an information unit which is smaller than one frame.

In this example, the audio data is decoded after the decoding start signal Ds from the external signal processing apparatus 304 is detected by the first processing section 302. In the case where the transmission delay time is found in advance, the signal processing device 301 does not require feedback such as the decoding start signal Ds. In FIG. 14, the synchronous word and the side information indicating the frame length are continuous to each other, but the same effect is achieved even when the synchronous word and the side information are not continuous.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An audio decoding device for decoding coded audio information with multiple channels, comprising:
    a coded information memory section for storing data making up frames of the coded audio information;
    an information transmission section for reading the data making up the frames of the coded audio information from arbitrary positions in the coded information memory section; and
    an audio decoding section for decoding the coded audio information read by the information transmission section and outputting the resultant audio information in accordance with a time axis,
    wherein the information transmission section includes a buffer memory for retaining an address of an actual pointer for reading the data making up the frames of the coded audio information in the coded information memory section so as not to be reread, an address of a temporary pointer for reading the data making up the frames of the coded audio information in the coded information memory section so as to be reread, actual pointer data read by the actual pointer, and temporary pointer data read by the temporary pointer.

2. An audio decoding device according to claim 1, wherein the actual pointer allows the coded audio information input before the coded audio information pointed by the actual pointer to be erased from the coded information memory section.

3. An audio decoding device according to claim 1, wherein:
    in the case where the coded audio information is to be decoded in the order of being input to the coded information memory section, the information transmission section transmits the coded audio information to the audio decoding section by one of the actual pointer and the temporary pointer in the order of being input to the coded information memory section; and
    in the case where the coded audio information is to be decoded in a different order from that of being input to the coded information memory section, the information transmission section transmits the coded audio information to the audio decoding section in accordance with a decoding order by the actual pointer and the temporary pointer.

4. An audio decoding device according to claim 1, wherein:
    in the case where coded audio information for a plurality of channels to be output simultaneously are stored proximately to each other in the coded information memory section, the information transmission section transmits the coded audio information for the plurality of channels to the audio decoding section by one of the actual pointer and the temporary pointer; and
    in the case where the coded audio information for the plurality of channels to be output simultaneously are stored discretely in the coded information memory section, the information transmission section transmits the coded audio information for the plurality of channels to the audio decoding section by the actual pointer and the temporary pointer.

5. An audio decoding device, comprising:
    a coded information memory section for accumulating data making up frames of coded audio information for a plurality of channels;
    an information transmission section for reading the data making up the frames of the audio coded information from arbitrary positions in the coded information memory section; and
    an audio decoding section for decoding the coded audio information read by the information transmission section and outputting the resultant audio information in accordance with a time axis, wherein:
    where an actual pointer reads the data making up the frames of the coded audio information in the coded information memory section so as not to be reread and a temporary pointer reads the data making up the frames of the coded audio information in the coded information memory section so as to be reread, in the case where the coded audio information for the plurality of channels to be output simultaneously are stored in the coded information memory section at such positions to be continuously transmitted to the audio decoding section, the information transmission section continuously transmits the coded audio information for the plurality of channels to the audio decoding section using one of the actual pointer and the temporary pointer; and in the case where the coded audio information for the plurality of channels to be output simultaneously are stored in the coded information memory section at such positions not to be continuously transmitted to the audio decoding section, the information transmission section continuously transmits the coded audio information for the plurality of channels to the audio decoding section using the actual pointer and the temporary pointer, and
    the audio decoding section decodes the coded audio information for the plurality of channels into audio information and outputs the resultant audio information for the plurality of channels simultaneously.

6. An audio decoding device for decoding coded audio information with multiple channels, comprising:

a coded information memory section for storing data making up frames of the coded audio information;

an information transmission section for reading the data making up the frames of the coded audio information from arbitrary positions in the coded information memory section; and an audio decoding section for decoding the coded audio information read by the information transmission section and outputting the resultant audio information in accordance with a time axis, wherein the information transmission section includes a buffer memory for retaining an address of an actual pointer for reading the data making up the frames of the coded audio information in the coded information memory section so as not to be reread, an address of a temporary pointer for reading the data making up the frames of the coded audio information in the coded information memory section so as to be reread, actual pointer data read by the actual pointer, and temporary pointer data read by the temporary pointer, and wherein the audio decoding section comprises a high-speed access memory having a minimized storage capacity for temporarily storing the coded audio information read by the information transmission section.

7. An audio decoding device, comprising:

a coded information memory section for accumulating data making up frames of coded audio information for a plurality of channels;

an information transmission section for reading the data making up the frames of the audio coded information from arbitrary positions in the coded information memory section; and an audio decoding section for decoding the coded audio information read by the information transmission section and outputting the resultant audio information in accordance with a time axis, wherein:

where an actual pointer reads the data making up the frames of the coded audio information in the coded information memory section so as not to be reread and a temporary pointer reads the data making up the frames of the coded audio information in the coded information memory section so as to be reread, in the case where the coded audio information for the plurality of channels to be output simultaneously are stored in the coded information memory section at such positions to be continuously transmitted to the audio decoding section, the information transmission section continuously transmits the coded audio information for the plurality of channels to the audio decoding section using one of the actual pointer and the temporary pointer; and in the case where the coded audio information for the plurality of channels to be output simultaneously are stored in the coded information memory section at such positions not to be continuously transmitted to the audio decoding section, the information transmission section continuously transmits the coded audio information for the plurality of channels to the audio decoding section using the actual pointer and the temporary pointer, the audio decoding section decodes the coded audio information for the plurality of channels into audio information and outputs the resultant audio information for the plurality of channels simultaneously, and wherein the audio decoding section comprises a high-speed access memory having a minimized storage capacity for temporarily storing the coded audio information read by the information transmission section.

* * * * *